(12) United States Patent
Mizusaki et al.

(10) Patent No.: US 9,239,493 B2
(45) Date of Patent: Jan. 19, 2016

(54) LIQUID CRYSTAL ALIGNMENT AGENT, LIQUID CRYSTAL DISPLAY, AND METHOD FOR MANUFACTURING LIQUID CRYSTAL DISPLAY

(75) Inventors: Masanobu Mizusaki, Osaka (JP); Youhei Nakanishi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 132 days.

(21) Appl. No.: 13/997,490

(22) PCT Filed: Dec. 21, 2011

(86) PCT No.: PCT/JP2011/079706
§ 371 (c)(1),
(2), (4) Date: Jun. 24, 2013

(87) PCT Pub. No.: WO2012/086715
PCT Pub. Date: Jun. 28, 2012

(65) Prior Publication Data
US 2013/0286340 A1    Oct. 31, 2013

(30) Foreign Application Priority Data
Dec. 22, 2010    (JP) .................... 2010-286046

(51) Int. Cl.
*G02F 1/1337* (2006.01)
*C08G 73/10* (2006.01)
*C09K 19/56* (2006.01)

(52) U.S. Cl.
CPC .......... *G02F 1/133723* (2013.01); *C08G 73/10* (2013.01); *C09K 19/56* (2013.01);
(Continued)

(58) Field of Classification Search
CPC .............. C09K 19/56; G02F 1/133723; G02F 1/133788; Y10T 428/1018; Y10T 428/1023; B32B 2457/202

USPC ................. 428/1.2–1.28; 349/123–136
See application file for complete search history.

(56) References Cited

U.S. PATENT DOCUMENTS 7,169,449 B2    1/2007    Nakanishi et al.
8,551,358 B2*   10/2013   Lee et al. .................. 252/299.6
(Continued)

FOREIGN PATENT DOCUMENTS

CN    1664657    9/2005
CN    101108968  1/2008
(Continued)

OTHER PUBLICATIONS

Office Action mailed Oct. 24, 2014 in U.S. Appl. No. 13/814,025.
(Continued)

*Primary Examiner* — Sophie Hon
(74) *Attorney, Agent, or Firm* — Nixon & Vanderhye P.C.

(57) ABSTRACT

The present invention provides a liquid crystal alignment agent capable of preventing a decrease in voltage holding ratio (VHR), a liquid crystal display containing such a liquid crystal alignment agent, and a method for manufacturing such a liquid crystal display. Aspects of the present invention include a liquid crystal alignment agent containing at least one polymer selected from a polyamic acid and an imide polymer thereof and at least one difunctional monomer having an anthracene or phenanthrene structure, a liquid crystal display including an alignment film formed on at least one of an active substrate and a counter substrate using the above liquid crystal alignment agent, and a method for manufacturing a liquid crystal display including the steps of forming an active substrate and forming a counter substrate, at least one of which includes forming an alignment film on the active substrate or the counter substrate using the above liquid crystal alignment agent.

6 Claims, 9 Drawing Sheets

(52) U.S. Cl.
CPC ..... *G02F1/133711* (2013.01); *B32B 2457/202* (2013.01); *Y10T 428/1018* (2015.01); *Y10T 428/1023* (2015.01)

(56) References Cited

U.S. PATENT DOCUMENTS

| | | |
|---|---|---|
| 2003/0067579 A1 | 4/2003 | Inoue et al. |
| 2003/0086044 A1 | 5/2003 | Inoue et al. |
| 2003/0095229 A1 | 5/2003 | Inoue et al. |
| 2004/0169790 A1 | 9/2004 | Inoue et al. |
| 2004/0174471 A1 | 9/2004 | Nakanishi et al. |
| 2004/0246406 A1 | 12/2004 | Inoue et al. |
| 2004/0263719 A1 | 12/2004 | Inoue et al. |
| 2005/0018105 A1 | 1/2005 | Inoue et al. |
| 2005/0024556 A1 | 2/2005 | Nakahata et al. |
| 2005/0030445 A1 | 2/2005 | Inoue et al. |
| 2005/0116200 A1 | 6/2005 | Nakanishi et al. |
| 2005/0253988 A1 | 11/2005 | Inoue et al. |
| 2005/0264737 A1 | 12/2005 | Kataoka et al. |
| 2007/0182887 A1 | 8/2007 | Haga et al. |
| 2008/0090026 A1 | 4/2008 | Bernatz et al. |
| 2008/0179565 A1 | 7/2008 | Hsieh et al. |
| 2008/0293888 A1 | 11/2008 | Bachels et al. |
| 2008/0316406 A1 | 12/2008 | Inoue et al. |
| 2009/0002858 A1 | 1/2009 | Okutsu et al. |
| 2009/0141215 A1 | 6/2009 | Bremer et al. |
| 2010/0076952 A1 | 3/2010 | Wang et al. |
| 2010/0253605 A1 | 10/2010 | Inada |
| 2011/0051049 A1 | 3/2011 | Goetz et al. |
| 2011/0058134 A1 | 3/2011 | Inoue et al. |
| 2011/0164213 A1 | 7/2011 | Nakanishi et al. |
| 2011/0199566 A1 | 8/2011 | Mazusaki et al. |
| 2011/0267574 A1 | 11/2011 | Kawahira et al. |
| 2012/0033167 A1 | 2/2012 | Mizusaki et al. |
| 2013/0004679 A1 | 1/2013 | Bachels |
| 2013/0128202 A1 | 5/2013 | Mizusaki et al. |
| 2013/0128203 A1 | 5/2013 | Mizusaki et al. |
| 2013/0128204 A1 | 5/2013 | Mizusaki et al. |
| 2013/0135570 A1 | 5/2013 | Mizusaki et al. |
| 2013/0169906 A1 | 7/2013 | Nakanishi et al. |
| 2013/0169916 A1 | 7/2013 | Mizusaki et al. |
| 2013/0271712 A1 | 10/2013 | Mizusaki et al. |
| 2013/0286340 A1 | 10/2013 | Mizusaki et al. |

FOREIGN PATENT DOCUMENTS

| | | |
|---|---|---|
| CN | 101008784 B | 1/2011 |
| JP | 63-233952 | 9/1988 |
| JP | 6-18898 | 1/1994 |
| JP | 9-227454 | 9/1997 |
| JP | 9-255706 | 9/1997 |
| JP | 10-338880 | 12/1998 |
| JP | 2002-323701 | 11/2002 |
| JP | 2003-177418 | 6/2003 |
| JP | 2003-307720 A | 10/2003 |
| JP | 2005-31288 | 2/2005 |
| JP | 2005-221617 | 8/2005 |
| JP | 2005-338613 | 12/2005 |
| JP | 2006-058775 | 3/2006 |
| JP | 2006-317896 | 11/2006 |
| JP | 2008-116931 | 5/2008 |
| JP | 2008-134666 | 6/2008 |
| JP | 4175826 | 8/2008 |
| JP | 2009-520702 | 5/2009 |
| JP | 2009-132718 A | 6/2009 |
| JP | 2010-107537 | 5/2010 |
| WO | 2008/078629 | 7/2008 |
| WO | WO 2009/118086 | 10/2009 |
| WO | WO 2010/026721 | 3/2010 |
| WO | 2010/041665 | 4/2010 |
| WO | WO 2010/047011 | 4/2010 |
| WO | WO 2010/079703 | 7/2010 |
| WO | WO 2010/116564 | 10/2010 |
| WO | WO 2010116564 A1 * | 10/2010 ........ G02F 1/133711 |

OTHER PUBLICATIONS

International Search Report mailed Oct. 4, 2011 in PCT/JP2011/070009.
International Search Report for PCT/JP2011/067049 mailed Sep. 6, 2011.
International Search Report for PCT/JP2011/067047, dated Sep. 6, 2011.
S. Mery et al., Liquid Crystals Containing a 2,6-Distributed Anthracene Core-Mesomorphism, Charge Transport and Photochemical Properties, Journal of Materials Chemistry, 2003, 1622-1630.
Restriction Requirement mailed Sep. 5, 2014 in U.S. Appl. No. 13/813,828.
Restriction Requirement mailed Oct. 8, 2014 in U.S. Appl. No. 13/814,055.
Restriction Requirement mailed Sep. 18, 2014 in U.S. Appl. No. 13/813,772.
International Search Report for PCT/JP2011/078159 mailed Jan. 24, 2012.
International Search Report for PCT/JP2011/067052, mailed Sep. 6, 2011.
International Search Report for PCT/JP2011/067051 mailed Sep. 6, 2011.
International Search Report for PCT/JP2011/079706, mailed Apr. 3, 2012.
U.S. Office Action mailed Dec. 15, 2014 in U.S. Appl. No. 13/813,828.
U.S. Office Action mailed Dec. 10, 2014 in U.S. Appl. No. 13/813,772.
U.S. Office Action mailed Dec. 4, 2014 in U.S. Appl. No. 13/814,055.
U.S. Office Action mailed Dec. 22, 2014 in U.S. Appl. No. 13/821,412.
International Search Report for PCT/JP2011/066159 mailed Sep. 6, 2011.
K. Maruyama et al., "The Photochemical Reaction of a- Diketones", Bulletin of the Chemical Society of Japan, Mar. 1972, vol. 45 pp. 847-851.
U.S. Office Action mailed Jan. 22, 2015 in U.S. Appl. No. 13/991,489.
U.S. Office Action mailed Feb. 13, 2015 in U.S. Appl. No. 13/814,025.
U.S. Office Action mailed Mar. 13, 2015 in U.S. Appl. No. 13/721,322.
U.S. Office Action mailed Nov. 6, 2014 in U.S. Appl. No. 13/721,322.
U.S. Office Action mailed Mar. 30, 2015 in U.S. Appl. No. 13/813,772 (Mizusaki).
Office Action mailed Mar. 13, 2015 in U.S. Appl. No. 13/821,322 (Nakanishi).
Office Action mailed Nov. 6, 2014 in U.S. Appl. No. 13/821,322 (Nakanishi).
U.S. Office Action mailed Mar. 17, 2015 in U.S. Appl. No. 13/814,055 (Mizusaki).
U.S. Office Action mailed Mar. 25, 2015 in U.S. Appl. No. 13/814,055 (Mizusaki).

* cited by examiner

LIQUID CRYSTAL ALIGNMENT AGENT, LIQUID CRYSTAL DISPLAY, AND METHOD FOR MANUFACTURING LIQUID CRYSTAL DISPLAY

This application is the U.S. national phase of International Application No. PCT/JP2011/079706, filed 21 Dec. 2011, which designated the U.S. and claims priority to JP Application No. 2010-286046, filed 22 Dec. 2010, the entire contents of each of which are hereby incorporated by reference.

TECHNICAL FIELD

The present invention relates to liquid crystal alignment agents, liquid crystal displays, and methods for manufacturing liquid crystal displays.

BACKGROUND ART

Liquid crystal displays are displays that present a display using a liquid crystal composition. In a typical display mode, the amount of light transmitted is controlled by applying a voltage to a liquid crystal composition sealed between a pair of substrates to change the orientation of liquid crystal molecules in the liquid crystal composition depending on the voltage applied.

Generally, alignment films are formed on surfaces of the substrates to control the orientation of the liquid crystal molecules when no voltage is applied thereto. These alignment films are subjected to an alignment process for aligning the liquid crystal molecules in a predetermined direction.

Among known materials for alignment films are imide-containing polymers synthesized by dehydration and ring closure of a polyamic acid (see PTLs 1 and 2).

Whereas rubbing with a fibrous material has been commonly used as an alignment technique, photoalignment, which is a non-contact process, has increasingly been used as an alternative alignment technique in recent years.

In photoalignment, an alignment film is irradiated with light in a predetermined direction to impart predetermined alignment properties to the surface of the alignment film. As used herein, the term "light" is not limited to visible light, but encompasses ultraviolet radiation (ultraviolet light), i.e., electromagnetic radiation with shorter wavelengths than visible light.

Photoalignment involves the use of, for example, an alignment film material having a side chain containing a photoreactive group (see PTLs 3 to 5). The photoreactive group is, for example, a functional group isomerizable by exposure or a functional group crosslinkable by exposure.

PTLs 3 and 4 disclose that the use of an alignment film containing a polyvinyl compound having a particular chemical structure and a polyimide allows the pretilt angle to be stably maintained. The raw material for the polyvinyl compound is a polyfunctional monomer such as biphenyl dimethacrylate.

CITATION LIST

Patent Literature

PTL 1: Japanese Unexamined Patent Application Publication No. 10-338880
PTL 2: Japanese Unexamined Patent Application Publication No. 2002-323701
PTL 3: Japanese Unexamined Patent Application Publication (Translation of PCT Application) No. 2009-520702
PTL 4: International Publication No. 2010/026721
PTL 5: International Publication No. 2010/047011

SUMMARY OF INVENTION

Technical Problem

Transmissive and transflective liquid crystal displays present a display by allowing light emitted from a light source (backlight), such as a cold cathode fluorescent lamp (CCFL) or light-emitting diode (LED), to enter a liquid crystal layer. Some reflective liquid crystal displays also use light emitted from a light source (frontlight). Research conducted by the inventors has revealed that such light sources emit not only visible light (light with wavelengths of 400 to 780 nm), but also ultraviolet light, which degrades the liquid crystal layer. Specifically, ultraviolet light forms ionic impurities in the liquid crystal layer, thus decreasing the voltage holding ratio (VHR), which is one of the display characteristics of liquid crystal displays.

In light of the foregoing, an object of the present invention is to provide a liquid crystal alignment agent capable of preventing a decrease in voltage holding ratio (VHR), a liquid crystal display containing such a liquid crystal alignment agent, and a method for manufacturing such a liquid crystal display.

Solution to Problem

The inventors have focused on a method using a novel liquid crystal alignment agent capable of sufficiently absorbing ultraviolet light as a method for preventing a decrease in voltage holding ratio (VHR). In PTLs 3 and 4, for example, biphenyl dimethacrylate is used as a polyfunctional monomer to stably maintain the pretilt angle. Although biphenyl monomers can absorb ultraviolet light with wavelengths of 320 nm or less, they do not absorb ultraviolet light with wavelengths of 330 nm or more. The inventors, however, have found that the use of, for example, a difunctional monomer having a polycyclic aromatic hydrocarbon structure (fused aromatic ring structure), such as anthracene or phenanthrene, in the molecule thereof as the raw material for the polyvinyl compound for stably maintaining the pretilt angle allows it to sufficiently absorb ultraviolet light, and have also found that this effect remains after an alignment film is formed from the liquid crystal alignment agent. The inventors have thus concluded that the above problems can be successfully solved and achieved the present invention.

Specifically, an aspect of the present invention is a liquid crystal alignment agent containing at least one polymer selected from a polyamic acid and an imide polymer thereof and at least one difunctional monomer, the at least one difunctional monomer including a difunctional monomer represented by general formula (I):

$$P^1\text{-}A^1\text{-}(Z^1\text{-}A^2)_n\text{-}P^2 \quad \text{(I)}$$

(wherein $P^1$ and $P^2$ are the same or different and are acrylate, methacrylate, vinyl, vinyloxy, or epoxy; $A^1$ and $A^2$ are the same or different and are one of polycyclic aromatic hydrocarbons represented by formulas (1) to (8):

[Chem. 1]

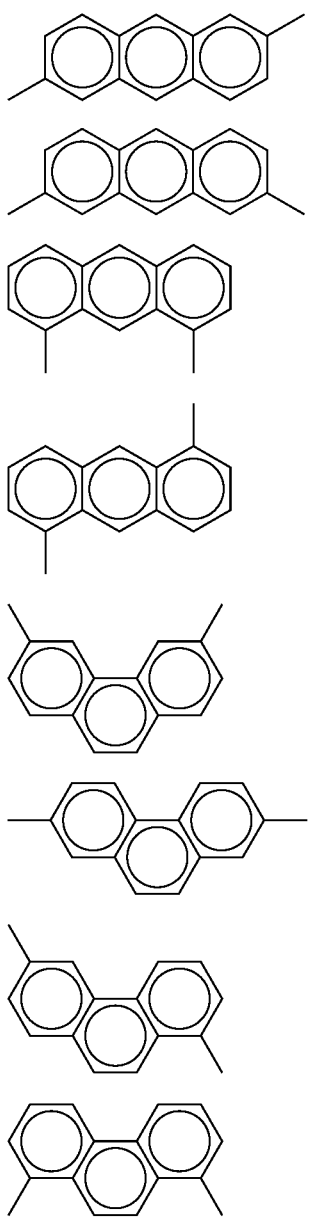

where the hydrogen atoms contained in A$^1$ and A$^2$ are optionally substituted with halogen, methyl, ethyl, or propyl; Z$^1$ is COO, OCO, O, CO, NHCO, CONH, or S, or is a direct bond between A$^1$ and A$^2$ or between A$^2$ and A$^2$; and n is 0, 1, or 2).

The at least one difunctional monomer may include difunctional monomers other than the difunctional monomer represented by general formula (I) above, or may be the difunctional monomer represented by general formula (I) above alone.

The liquid crystal alignment agent, containing the difunctional monomer represented by general formula (I) above, can sufficiently absorb ultraviolet light contained in light emitted from a light source. This reduces formation of ionic impurities in the liquid crystal layer due to ultraviolet light, thus preventing a decrease in voltage holding ratio (VHR) over time.

The difunctional monomer preferably absorbs light with wavelengths of 330 nm or more. Also, the difunctional monomer preferably absorbs light with wavelengths of 430 nm or less. Thus, a difunctional monomer that absorbs light with wavelengths of 330 to 430 nm is suitable. The difunctional monomer preferably absorbs light with wavelengths of at least 360 nm or more and may absorb light with wavelengths of 370 nm or more because light from light sources tends to contain a high proportion of light with wavelengths of 360 nm or more, particularly light with wavelengths of 370 nm or more. More preferably, the difunctional monomer absorbs light with wavelengths of 400 nm or less because visible light absorption might decrease the display quality.

The difunctional monomer exhibits the same level of light absorption in the ultraviolet region after polymerization as before polymerization because the polycyclic aromatic moieties (anthracene or phenanthrene backbone moieties) are predominant in the light absorption of the difunctional monomer in the ultraviolet region (particularly, 330 to 430 nm).

As used herein, "to exhibit light absorption" means to exhibit an average absorbance of 1% or more, preferably 10% or more, relative to the absorbance at a peak of an absorption spectrum in the wavelength region of the light to be absorbed (for example, 330 to 430 nm). Preferably, the peak of the absorption spectrum lies within the wavelength region of the light to be absorbed.

A polymer of the difunctional monomer functions to structurally stabilize an alignment film formed from the liquid crystal alignment agent according to the present invention, thus preventing deformation of the component that changes the pretilt angle. This allows the pretilt direction and angle to be fixed, thereby effectively preventing degradation of the display characteristics of the liquid crystal display. The term "difunctional monomer" refers to a monomer having two functional groups (polymerizable groups) per molecule that can serve as a reaction point of a polymerization reaction. Examples of polymerizable groups include radical reactive functional groups having a double bond formed between two carbon atoms.

If P$^1$ and P$^2$, which correspond to the polymerizable groups, are independently acrylate, methacrylate, vinyl, vinyloxy, or epoxy, such a difunctional monomer generally has high solubility in the solvent in which at least one polymer selected from a polyamic acid and an imide polymer thereof is dissolved, which is advantageous in that the concentration of the difunctional monomer in the liquid crystal alignment agent can be easily controlled when the liquid crystal alignment agent is applied to form an alignment film. Examples of solvents include N-methylpyrrolidone (NMP) and γ-butyl cellosolve.

Another aspect of the present invention is a liquid crystal display including an active substrate, a counter substrate, and a liquid crystal layer disposed between the active substrate and the counter substrate, at least one of the active substrate and the counter substrate having an alignment film formed using a liquid crystal alignment agent containing at least one polymer selected from a polyamic acid and an imide polymer thereof and at least one difunctional monomer, the at least one difunctional monomer including a difunctional monomer represented by general formula (I) above.

Because the liquid crystal display according to the present invention includes the alignment film formed using the above liquid crystal alignment agent, the alignment film contains at least one of the difunctional monomer, an oligomer derived therefrom, and a polymer derived therefrom, any of which can absorb ultraviolet light contained in light from a backlight. This prevents degradation of the liquid crystal due to ultraviolet light, thus reducing a decrease in voltage holding ratio (VHR) over time.

Another aspect of the present invention is a method for manufacturing a liquid crystal display, including the steps of forming an active substrate, forming a counter substrate, and forming a liquid crystal layer between the active substrate and the counter substrate, at least one of the steps of forming the active substrate and forming the counter substrate including the steps of providing a pixel electrode or a counter electrode and forming an alignment film on the active substrate or the counter substrate using a liquid crystal alignment agent containing at least one polymer selected from a polyamic acid and an imide polymer thereof and at least one difunctional monomer, the at least one difunctional monomer including a difunctional monomer represented by general formula (I) above.

Because the method for manufacturing a liquid crystal display according to the present invention forms an alignment film using the above liquid crystal alignment agent, the decrease in voltage holding ratio (VHR) over time is reduced, thus allowing the manufacture of a reliable liquid crystal display.

A preferred example of the at least one difunctional monomer is a difunctional monomer of general formula (I) above where n=0, $P^1$ and $P^2$ are the same or different and are acrylate or methacrylate, and $A^1$ is the polycyclic aromatic hydrocarbon represented by formula (1) or (6) above.

The use of the difunctional monomer having the particular structure as described above is particularly advantageous in stably maintaining the pretilt direction and angle. One reason is that if $P^1$ and $P^2$ are independently acrylate or methacrylate, the difunctional monomer and the polymer thereof form no chemical bond with the at least one polymer selected from a polyamic acid and an imide polymer thereof.

The at least one polymer may be, for example, a polymer that aligns the liquid crystal perpendicularly. The use of such a polymer allows a vertical alignment mode liquid crystal display, such as a vertical alignment twisted nematic (VATN) mode or multi-domain vertical alignment (MVA) mode liquid crystal display, to be implemented in the present invention.

The polymer that aligns the liquid crystal perpendicularly may be, for example, a polymer having a photoreactive functional group. The use of such a polymer allows the present invention to be applied to photoalignment. Because photoalignment can be performed, for example, by irradiating the active substrate or the counter substrate with ultraviolet light on the side where the alignment film is formed before they are bonded together, the difunctional monomer can be prevented from blocking photoalignment. During photoalignment, some of the difunctional monomer may absorb ultraviolet light to form a polymer.

Examples of photoreactive functional groups include chalcone, cinnamate, azo, and coumarin. The use of such a photoreactive functional group allows the pretilt angle to be controlled with high precision.

In one embodiment, the weight percentage of the at least one difunctional monomer to the at least one polymer is more than 5% and is less than 20%. If the weight percentage of the difunctional monomer is less than 5%, the difunctional monomer might insufficiently provide the effect of preventing a decrease in voltage holding ratio (VHR) over time. If the weight percentage of the difunctional monomer is more than 20%, the alignment film might become opaque and thus exhibit decreased light transmittance.

In one embodiment, the liquid crystal display according to the present invention further includes a polymer layer formed between the liquid crystal layer and the alignment film by photopolymerization of a monomer contained in the liquid crystal layer. In one embodiment, the method for manufacturing a liquid crystal display according to the present invention further includes a step of forming a polymer layer between the liquid crystal layer and the alignment film by photopolymerization of a monomer contained in the liquid crystal layer.

The present invention is also suitable for use with the technique of forming a polymer layer by photopolymerization of a monomer contained in the liquid crystal layer (polymer sustained alignment (PSA)). PSA allows formation of a polymer layer (PSA layer) whose surface profile matches the orientation of liquid crystal molecules when a voltage is applied to the liquid crystal layer. The PSA layer functions to determine the orientation (initial orientation) of the liquid crystal molecules when no voltage is applied thereto, thus allowing, for example, stabilized alignment of the liquid crystal layer and improved response speed.

Advantageous Effects of Invention

The liquid crystal alignment agent according to the present invention, containing the difunctional monomer represented by general formula (I) above, can prevent a decrease in voltage holding ratio (VHR) due to ultraviolet light emitted from a light source of a liquid crystal display.

The liquid crystal display including the alignment film according to the present invention exhibits little decrease in voltage holding ratio (VHR) over time. The method for manufacturing a liquid crystal display according to the present invention allows the manufacture of a liquid crystal display that exhibits little decrease in voltage holding ratio (VHR) over time.

DESCRIPTION OF EMBODIMENTS

First Embodiment

Figure 1:
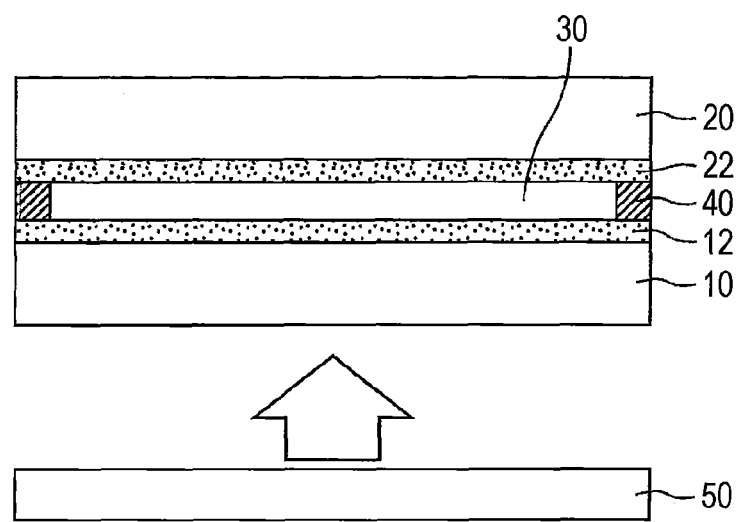
FIG. 1 is a schematic sectional view of a VATN mode liquid crystal display according to a first embodiment.
Figure 2:
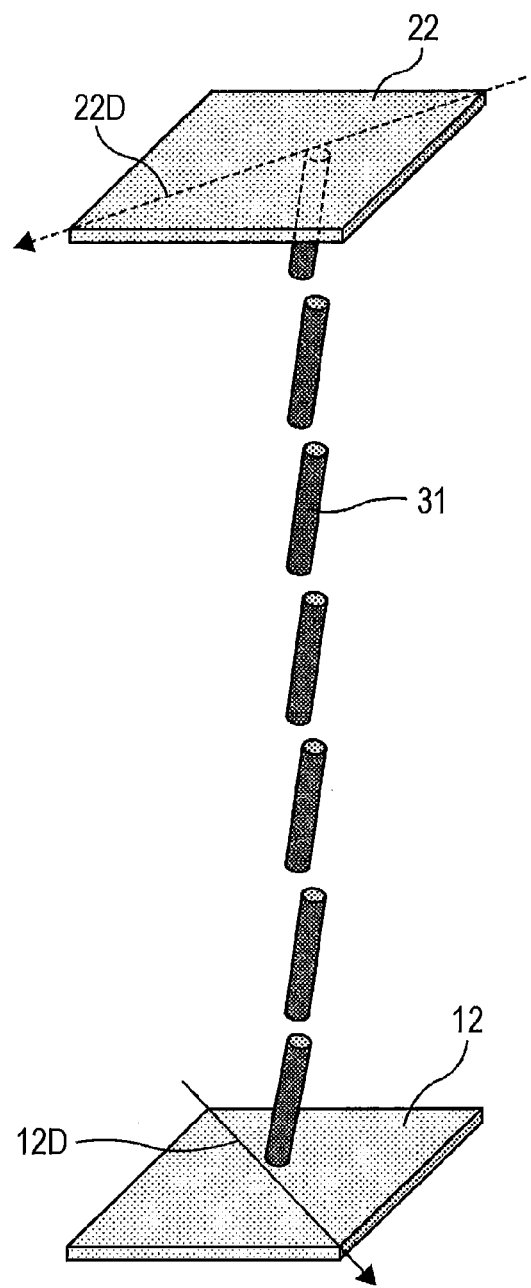
FIG. 2 is a conceptual diagram illustrating the off-state of the VATN mode liquid crystal display.
Figure 3:
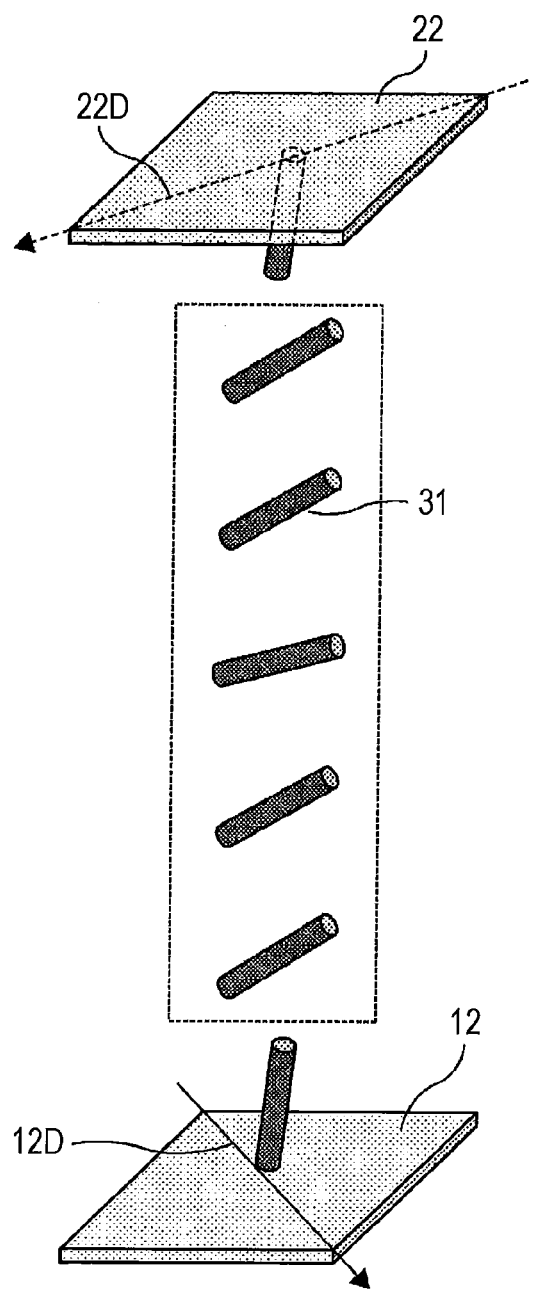
FIG. 3 is a conceptual diagram illustrating the on-state of the VATN mode liquid crystal display.

This embodiment relates to a vertical alignment twisted nematic (VATN) mode liquid crystal display. FIG. 1 is a schematic sectional view of the VATN mode liquid crystal display according to the first embodiment. FIG. 2 is a conceptual diagram illustrating the off-state of the VATN mode liquid crystal display, and FIG. 3 is a conceptual diagram illustrating the on-state of the VATN mode liquid crystal display.

As shown in FIG. 1, the liquid crystal display according to this embodiment includes a liquid crystal display panel including an array substrate 10, a counter substrate 20 bonded thereto with a sealant 40, and a liquid crystal layer 30 sealed therebetween. The array substrate 10, the liquid crystal layer 30, and the counter substrate 20 are arranged in the above order from the backside toward the display side (viewing side), and a backlight 50 is disposed on the backside of the liquid crystal display panel. The liquid crystal display according to this embodiment is a transmissive liquid crystal display that presents a display using light emitted from the backlight 50 (the direction in which the light travels is indicated by the empty arrow in FIG. 1), and the light passes through, in order, the array substrate 10, the liquid crystal layer 30, and the counter substrate 20.

The array substrate 10 is an insulating transparent substrate, such as a glass substrate, on which are stacked conductive members such as wiring lines, thin-film transistors (TFTs), and pixel electrodes and a plurality of insulating films. An alignment film 12 is formed on the surface of the array substrate 10 facing the liquid crystal layer 30.

The counter substrate 20 is an insulating transparent substrate, such as a glass substrate, on which are disposed components such as color filters, a black matrix, and a common electrode. An alignment film 22 is formed on the surface of the counter substrate 20 facing the liquid crystal layer 30.

The liquid crystal layer 30 contains liquid crystal molecules having negative dielectric anisotropy. As shown in FIG. 2, in an off-state, in which the voltage applied to the liquid crystal layer 30 falls below a threshold voltage, liquid crystal molecules 31 are aligned substantially perpendicular to the surfaces of the alignment films 12 and 22 (substrate plane) and have a pretilt angle of, for example, from 85° to less than 90°. The liquid crystal molecules 31 are twisted between the alignment films 12 and 22, and the alignment direction 12D of the liquid crystal molecules 31 near the alignment film 12 are perpendicular to the alignment direction 22D of the liquid crystal molecules 31 near the alignment film 22. As shown in FIG. 3, in an on-state, in which the voltage applied to the liquid crystal layer 30 exceeds the threshold voltage, the liquid crystal molecules 31, having negative dielectric anisotropy, fall parallel to the substrate plane depending on the voltage applied. Thus, the liquid crystal layer 30 is birefringent to the light passing therethrough.

The alignment films 12 and 22 are formed by depositing and baking a liquid crystal alignment agent containing at least one polymer selected from a polyamic acid and an imide polymer thereof and at least one difunctional monomer that absorbs light with wavelengths of 330 nm or more. The constituents of the alignment films 12 and 22 can be determined by chemical analysis using, for example, $^{13}$C-nuclear magnetic resonance (NMR) or mass spectrometry (MS).

The surfaces of the alignment films 12 and 22 are subjected to an alignment process. In an off-state, therefore, the pretilt (initial tilt) of the liquid crystal molecules can be aligned in a predetermined direction. Examples of alignment techniques include rubbing and photoalignment. Photoalignment will be described below.

Figure 4:
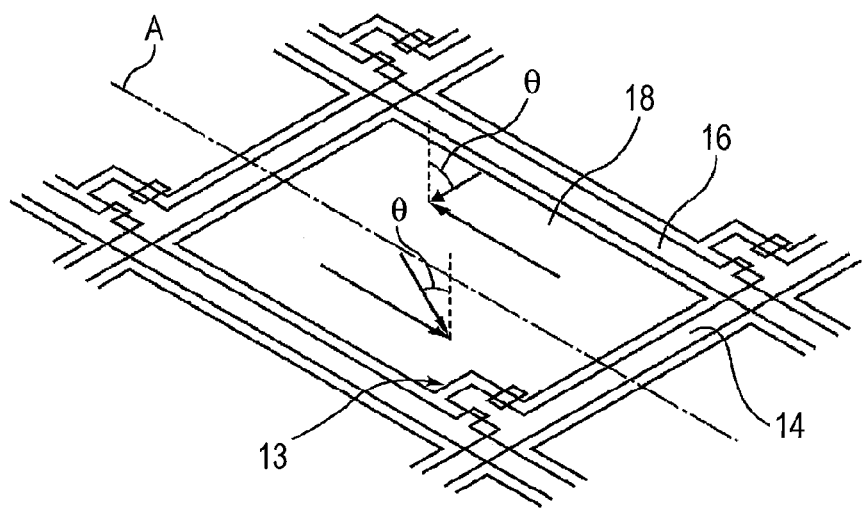
FIG. 4 is an illustrative diagram schematically showing the relationship between pixels and an alignment process on an array substrate according to the first embodiment.

FIG. 4 is an illustrative diagram schematically showing the relationship between the pixels and the alignment process on the array substrate according to the first embodiment. As an example, described herein is a pixel of a typical structure including a pixel electrode 18 disposed in a region defined by two parallel source signal lines 16 and two parallel gate signal lines 14 and a thin-film transistor 13 that controls the voltage applied to the pixel electrode 18. The pixel structure applied to this embodiment, however, is not limited to the configuration illustrated in FIG. 4. As shown in FIG. 4, each pixel of the array substrate 10 is assumed to be divided into two regions substantially midway (at line A in the figure) between the two parallel source signal lines 16 surrounding the pixel. Each region is irradiated with ultraviolet light in a direction inclined with respect to the normal to the plane of the pixel by a predetermined angle θ. The direction of ultraviolet light irradiation in each region is set such that, when the optical axis of the ultraviolet light in each region is projected in the plane of the pixel, these projected optical axes are oriented parallel to the source signal lines 16 and 180° from each other.

Figure 5:
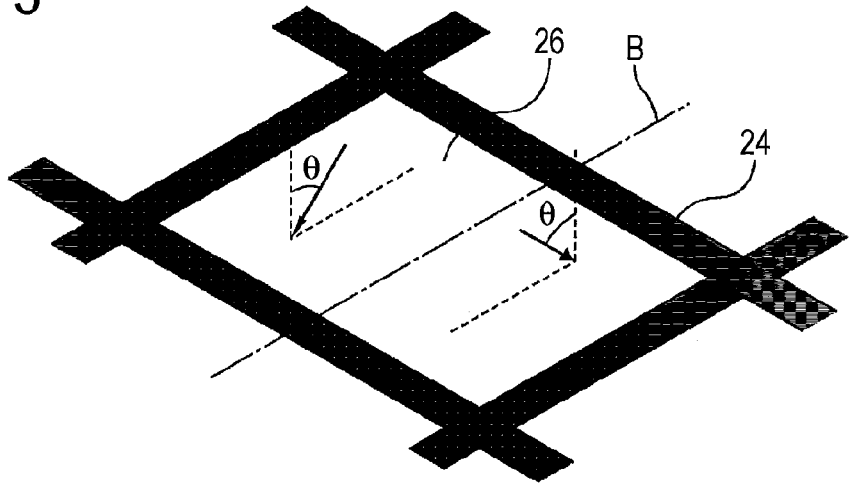
FIG. 5 is a diagram schematically showing photoalignment on a counter substrate according to the first embodiment.

FIG. 5 is a diagram schematically showing photoalignment on the counter substrate according to the first embodiment. As shown in FIG. 5, the counter substrate 20 has a black matrix 24 formed in a grid pattern and color filters 26 formed in the picture elements defined by the grid pattern. Each picture element of the counter substrate 20 is assumed to be divided into two regions substantially midway (at line B in the figure) between the two sides defining the boundaries of the picture element that are parallel to the gate signal lines 14 on the array substrate 10 when the counter substrate 20 is bonded to the array substrate 10. Each region is irradiated with ultraviolet light in a direction inclined with respect to the normal to the plane of the pixel by a predetermined angle θ. The direction of ultraviolet light irradiation in each region is set such that, when the optical axis of the ultraviolet light in each region is projected in the plane of the pixel, these projected optical axes are oriented parallel to the gate signal lines 14 on the array substrate 10 and 180° from each other.

Figure 6:
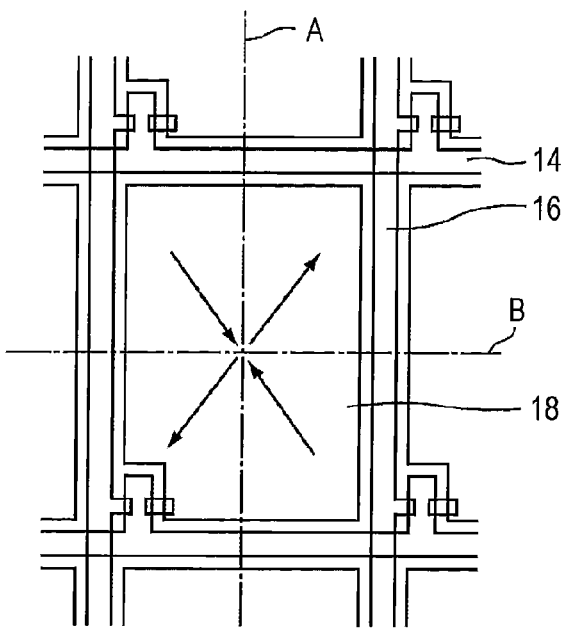
FIG. 6 is a diagram schematically showing the alignment directions of liquid crystal molecules in each pixel of a liquid crystal display panel assembled by bonding the array substrate shown in FIG. 4 and the counter substrate shown in FIG. 5.

FIG. 6 is a diagram schematically showing the alignment directions of liquid crystal molecules in each pixel of a liquid crystal display panel assembled by bonding the array substrate shown in FIG. 4 and the counter substrate shown in FIG. 5. When a liquid crystal display panel is assembled by bonding the two substrates 10 and 20 subjected to the alignment process as described above, as shown in FIG. 6, the liquid crystal molecules 31 sealed between the two substrates 10 and 20 are aligned in the direction of the alignment process, i.e., the direction of ultraviolet light irradiation, in each region of the substrates 10 and 20. As a result, four domains in which the liquid crystal molecules 31 are aligned in different directions are formed in each region. The VATN mode requires pretilt angle control with particularly high precision because the display quality is significantly affected by the difference between the pretilt angle near the alignment film 12 and the pretilt angle near the alignment film 22.

A polarizer is disposed on the backside of the array substrate 10. Another polarizer is disposed on the viewing side of the counter substrate 20. A retarder may be disposed between the pair of polarizers.

The backlight 50 may be of any particular type, such as the edge-lit type or the direct-lit type. For an edge-lit backlight, light emitted from a light source enters a light guide from a side thereof, leaves the light guide from a main surface thereof as planar light after reflection and diffusion, passes through optical sheets such as a prism sheet, and leaves the backlight as display light. For a direct-lit backlight, light emitted from a light source passes through optical sheets such as a reflector sheet, a diffuser sheet, and a prism sheet directly without a light guide and leaves the backlight as display light.

The light source may be of any particular type, although if a light source that emits ultraviolet light with wavelengths of 330 nm or more is used, the use of at least one difunctional monomer that absorbs light with wavelengths of 330 nm or more and a polymer thereof provides the effect of reducing a decrease in voltage holding ratio (VHR). The light source may be, for example, a light-emitting diode (LED) or a cold cathode fluorescent lamp (CCFL).

Examples 1 to 8 and Comparative Examples 1 to 5

In Examples 1 to 8, VATN mode liquid crystal display panels according to the first embodiment were actually fabricated using liquid crystal alignment agents according to the present invention, and the voltage holding ratios (VHR) of the liquid crystal display panels were measured. In Comparative Examples 1 to 5, the voltage holding ratios (VHR) of liquid crystal display panels were measured as in Examples 1 to 8 except that liquid crystal alignment agents with different compositions were used.

Figure 7:
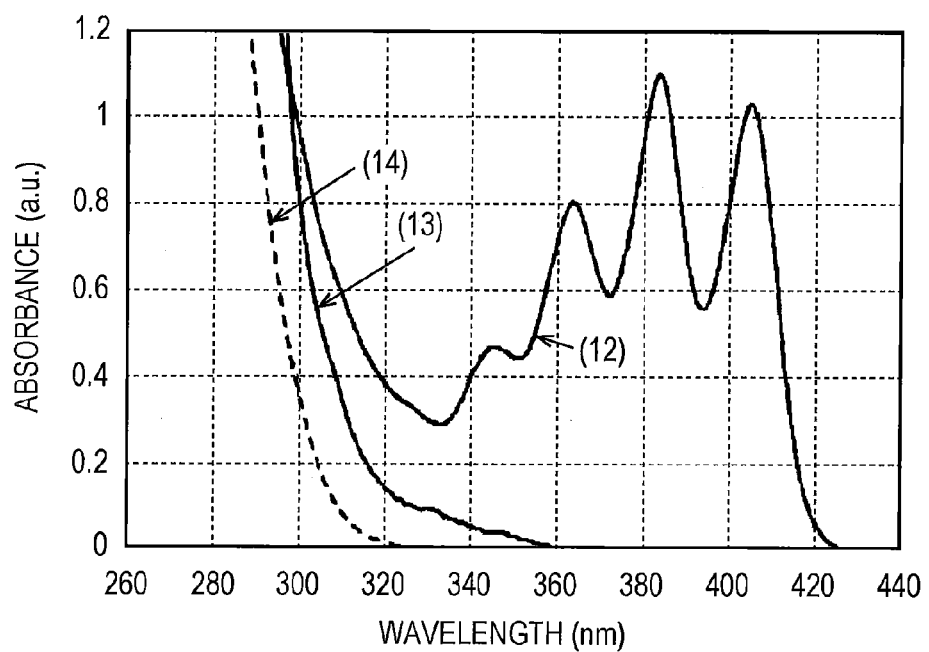
FIG. 7 is a graph showing the absorption spectra of difunctional monomers of formulas (12) to (14).

Liquid crystal alignment agents (alignment film compositions) were first prepared by adding difunctional monomers represented by formulas (12) to (14) below to a solution in N-methylpyrrolidone (NMP) of a polymer for vertical alignment films represented by formula (9) below in the weight ratios shown in Table 1 below. The difunctional monomer represented by formula (12) below has anthracene in the molecule thereof and can absorb light with wavelengths of 330 nm or more. The difunctional monomer represented by formula (13) below has phenanthrene in the molecule thereof and can absorb light with wavelengths of 330 nm or more. FIG. 7 is a graph showing the absorption spectra of the difunctional monomers of formulas (12) to (14).

[Chem. 2]

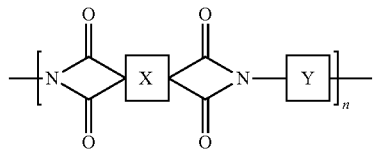

(9)

For the polymer for vertical alignment films in Examples 1 to 8 and Comparative Examples 1 to 5, in formula (9) above, X is a chemical structure of formula (10) below, and Y is a site where a diamine monomer having a photoreactive functional group of formula (11) below is introduced.

[Chem. 3]

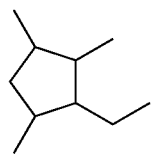

(10)

[Chem. 4]

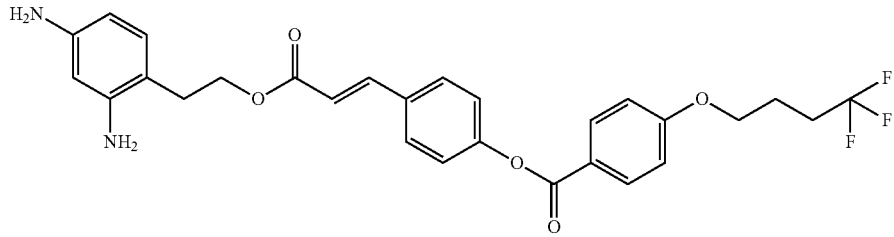

(11)

[Chem. 5]

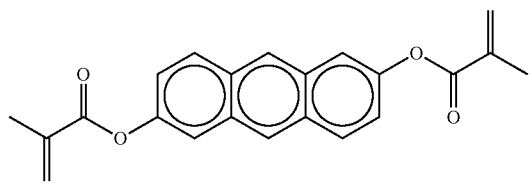

(12)

-continued

[Chem. 6]

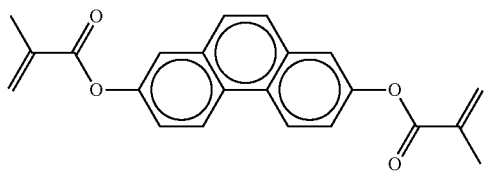

(13)

[Chem. 7]

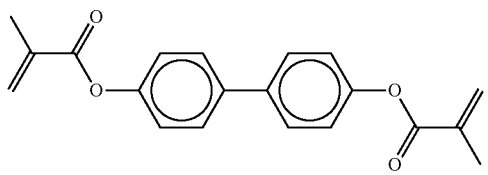

(14)

TABLE 1

|  | Type of difunctional monomer | Weight ratio of difunctional monomer to polymer for vertical alignment films |
|---|---|---|
| Example 1 | Formula (12) | 1/40 |
| Example 2 | Formula (12) | 1/20 |
| Example 3 | Formula (12) | 1/10 |
| Example 4 | Formula (12) | 1/5 |
| Example 5 | Formula (13) | 1/40 |
| Example 6 | Formula (13) | 1/20 |
| Example 7 | Formula (13) | 1/10 |
| Example 8 | Formula (13) | 1/5 |
| Comparative Example 1 | Formula (14) | 1/40 |
| Comparative Example 2 | Formula (14) | 1/20 |
| Comparative Example 3 | Formula (14) | 1/10 |
| Comparative Example 4 | Formula (14) | 1/5 |
| Comparative Example 5 | Not contained | 0 |

Next, each of the liquid crystal alignment agents prepared as described above was deposited on a surface of an array substrate 10. Similarly, each of the liquid crystal alignment agents prepared as described above was deposited on a surface of a counter substrate 20. The deposited liquid crystal alignment agent was prebaked and postbaked. The liquid crystal alignment agent was then subjected to photoalignment by irradiation with polarized ultraviolet light in a direction inclined with respect to the normal to the substrate plane (oblique direction).

Next, after a sealant 40 was applied to the periphery of the array substrate 10 and beads were dispersed over the entire surface of the counter substrate 20, the array substrate 10 and the counter substrate 20 were bonded together. The orientations of the two substrates 10 and 20 were adjusted such that the alignment direction of the array substrate 10 was perpendicular to the alignment direction of the counter substrate 20. The two substrates 10 and 20 bonded with the sealant 40 had a gap of the distance corresponding to the size of the beads. A liquid crystal composition having negative dielectric anisotropy was then injected into the gap between the substrates 10 and 20. Thus, liquid crystal display panels for measurement were fabricated.

Each of the liquid crystal display panels fabricated as described above was mounted above a direct-lit backlight having light-emitting diodes (LEDs) and was continuously irradiated with light from the backlight for 1,000 hours, and the voltage holding ratios (VHR) before and after irradiation were compared. The voltage holding ratios were calculated by placing the liquid crystal display panel in an oven at 70° C. and measuring the electric charge held 16.61 milliseconds (ms) after a voltage of 1 V was applied. The measurements of the voltage holding ratios are shown in Table 2 below.

TABLE 2

|  | Initial VHR(%) | VHR after 1,000 hours (%) |
|---|---|---|
| Example 1 | 99.5 | 97.5 |
| Example 2 | 99.5 | 98.5 |
| Example 3 | 99.5 | 98.5 |
| Example 4 | 99.5 | 98.5 |
| Example 5 | 99.5 | 97.5 |
| Example 6 | 99.5 | 98.5 |
| Example 7 | 99.5 | 98.5 |
| Example 8 | 99.5 | 98.5 |
| Comparative Example 1 | 99.5 | 92.3 |
| Comparative Example 2 | 99.5 | 95.4 |
| Comparative Example 3 | 99.5 | 95.4 |
| Comparative Example 4 | 99.5 | 95.5 |
| Comparative Example 5 | 99.5 | 93.0 |

As shown in Table 2, Examples 1 to 8, in which a difunctional monomer having anthracene or phenanthrene in the molecule thereof was added, showed smaller decreases in voltage holding ratio and maintained higher voltage holding ratios after continuous irradiation with light from the backlight for 1,000 hours than Comparative Examples 1 to 4, in which a difunctional monomer having biphenyl in the molecule thereof was added, and Comparative Example 5, in which no difunctional monomer was added. The above measurements demonstrate that, in Examples 1 to 8, the difunctional monomer present in the alignment films 12 and 22 or an oligomer or polymer derived therefrom absorbed ultraviolet light contained in the light from the backlight, thus preventing degradation of the liquid crystal due to ultraviolet light.

Among Examples 1 to 8, Examples 2 to 4 and 6 to 8, in which the mixing ratio of the difunctional monomer to the polymer for vertical alignment films was 1/20 or more, showed voltage holding ratios of more than 98% after 1,000 hours.

In Examples 4 and 8, the alignment films 12 and 22 exhibited decreased light transmittance because the liquid crystal alignment agent became opaque after postbaking. In view of light transmittance, therefore, the weight ratio of the difunctional monomer to the polymer for vertical alignment films is preferably 1/10 or less.

Although the diamine monomer having the photoreactive functional group represented by formula (II) above was introduced into the polymer for vertical alignment films in Examples 1 to 8 above, the diamine monomer represented by formula (II) above may be replaced by diamine monomers having a photoreactive functional group that are represented by formulas (I-1) to (I-23) below.

[Chem. 8]

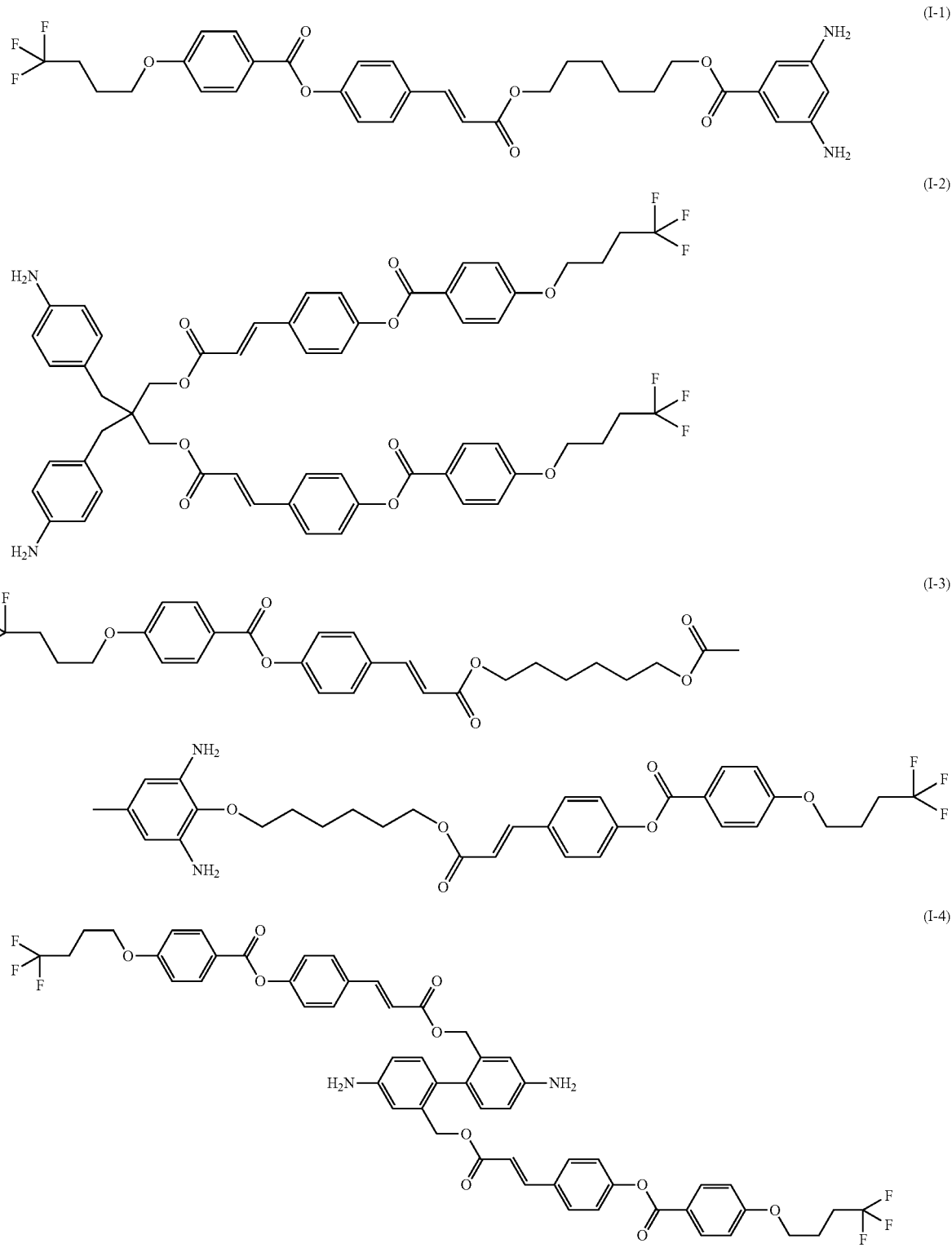

(I-5)
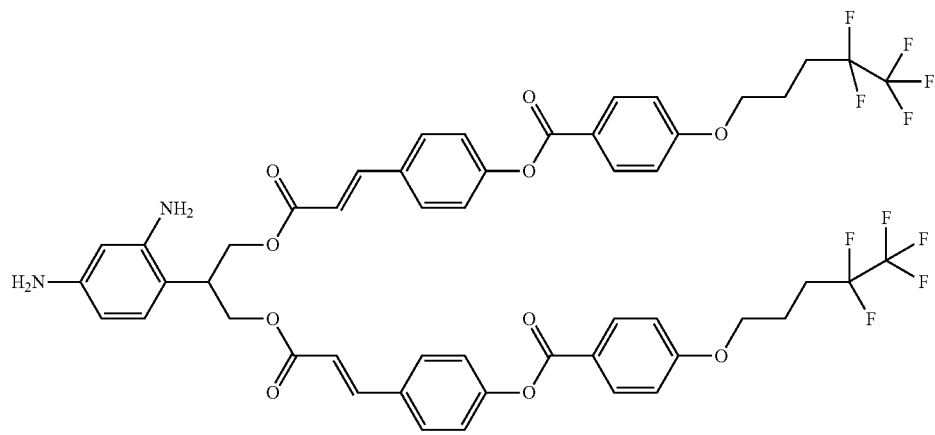
(I-6)
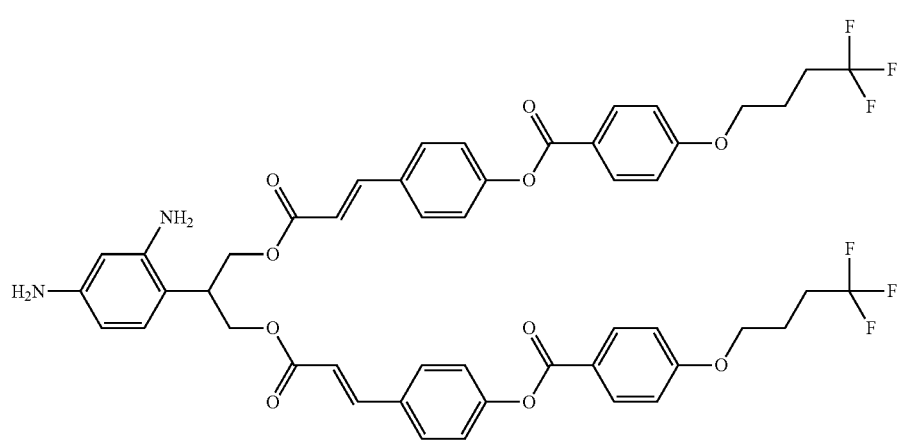
[Chem. 9]
(I-7)
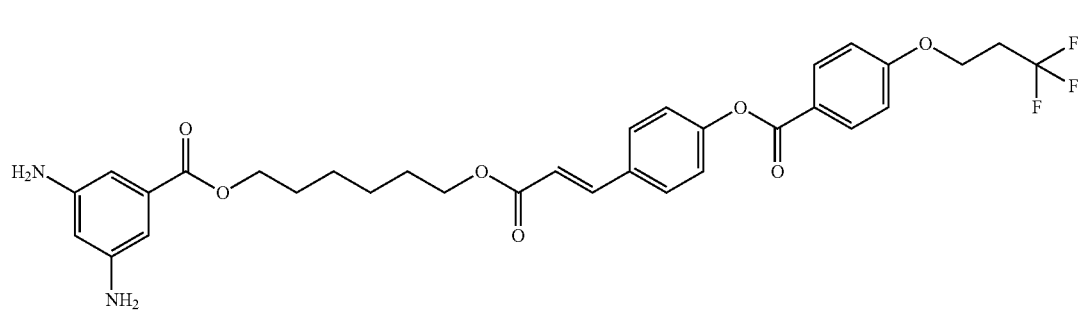
(I-8)
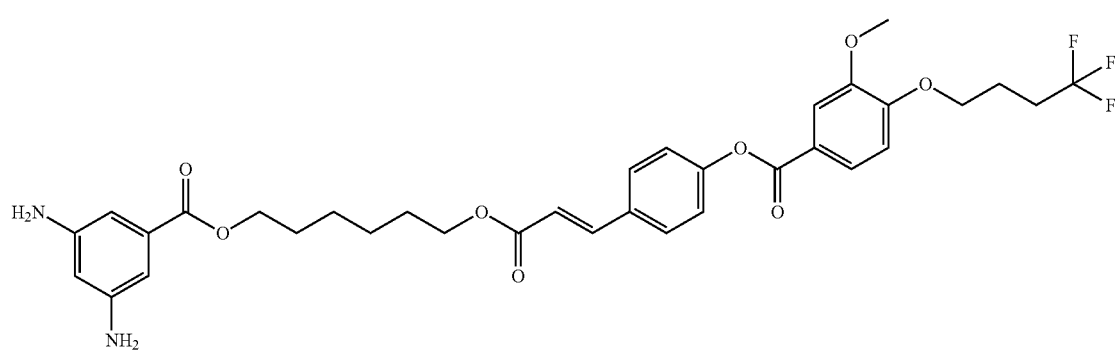

(I-9)
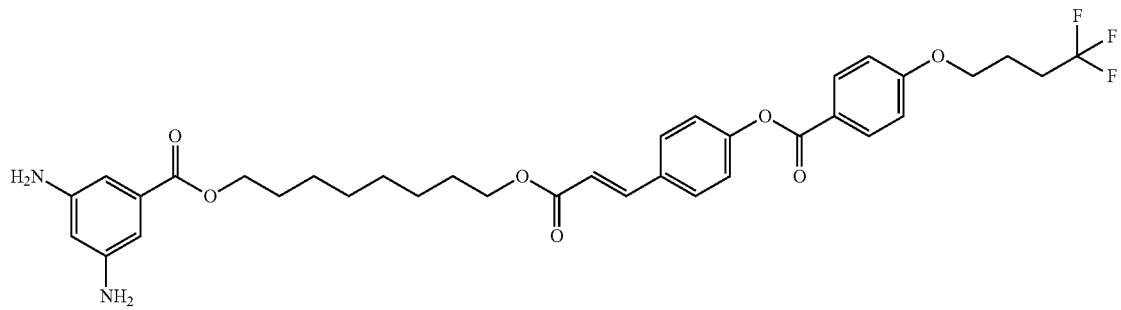
(I-10)
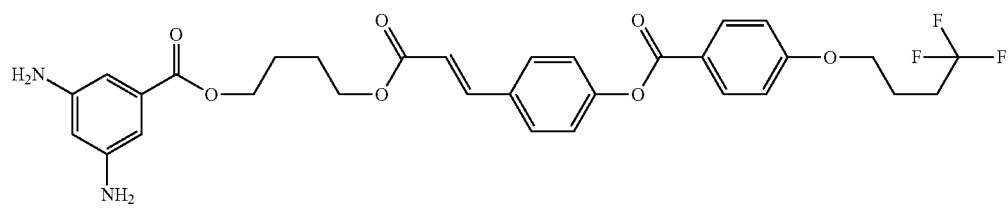
(I-11)
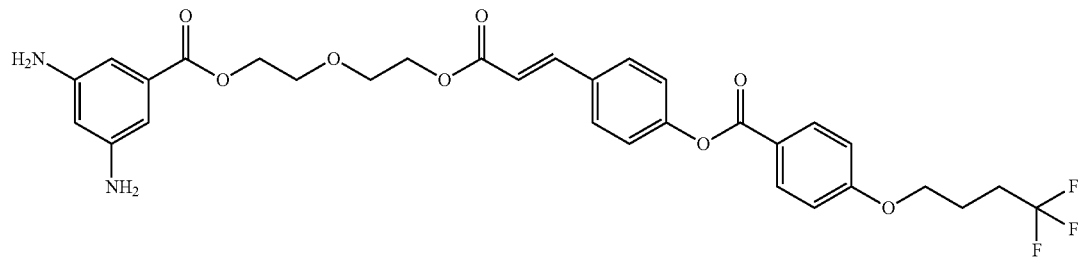
(I-12)
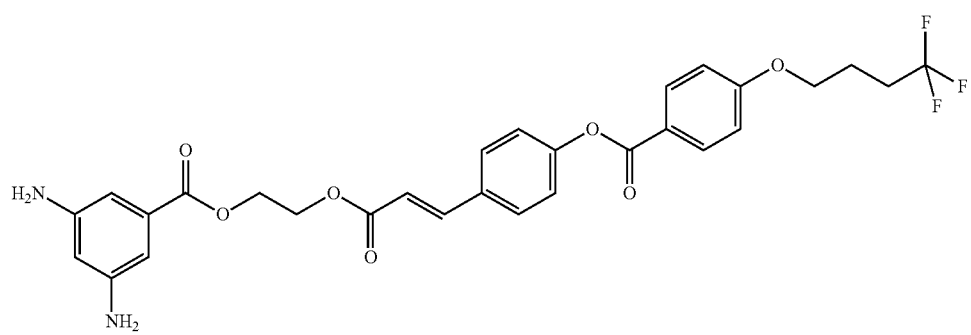
(I-13)
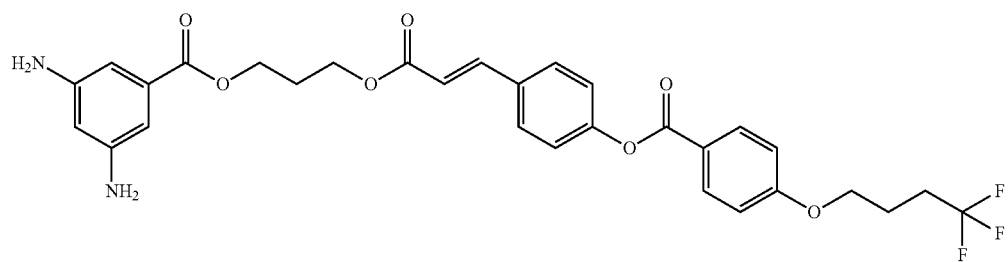

-continued
[Chem. 10]
(I-14)
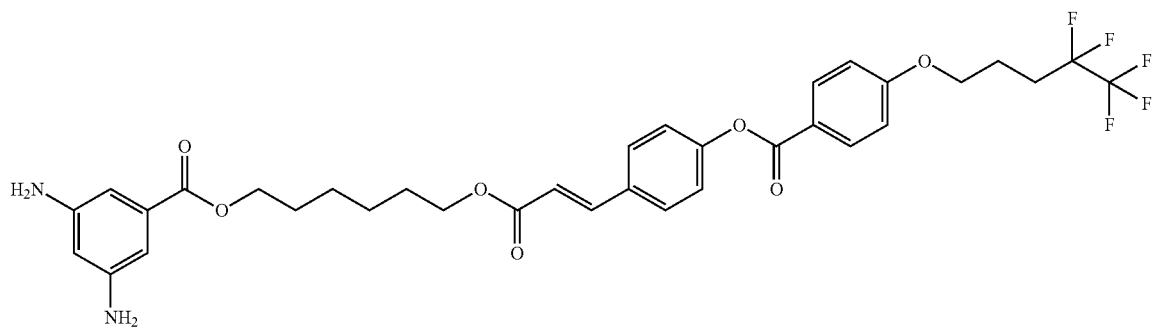
(I-15)
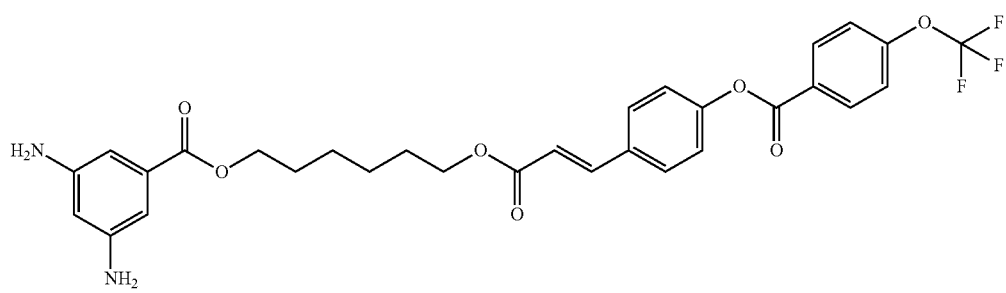
(I-16)
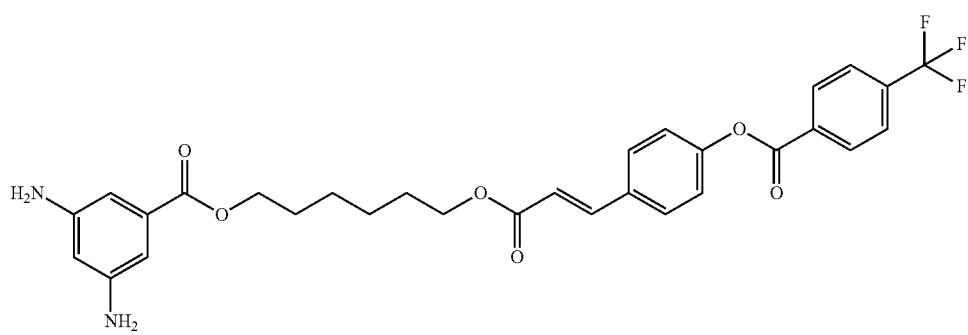
(I-17)
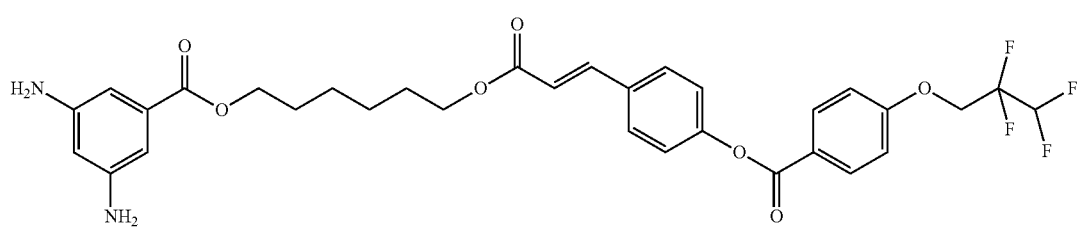
(I-18)
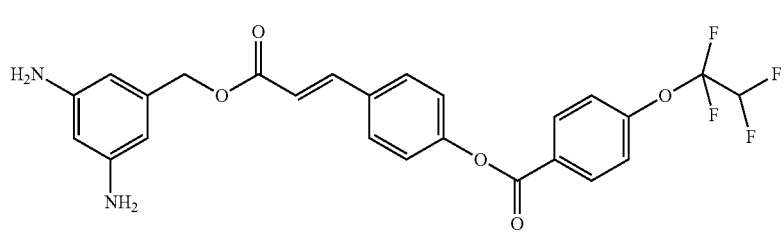

(I-19)
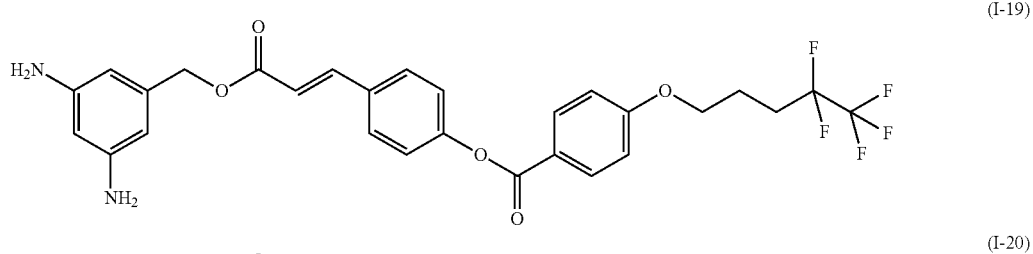

(I-20)
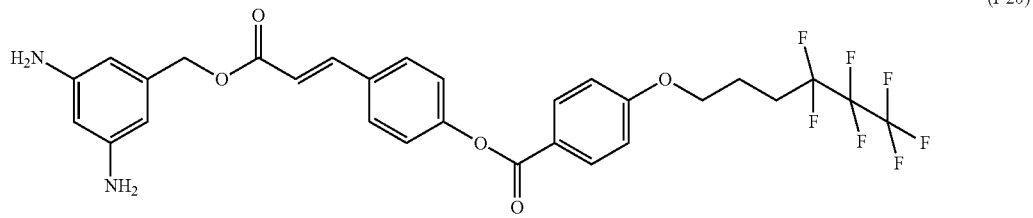

(I-21)
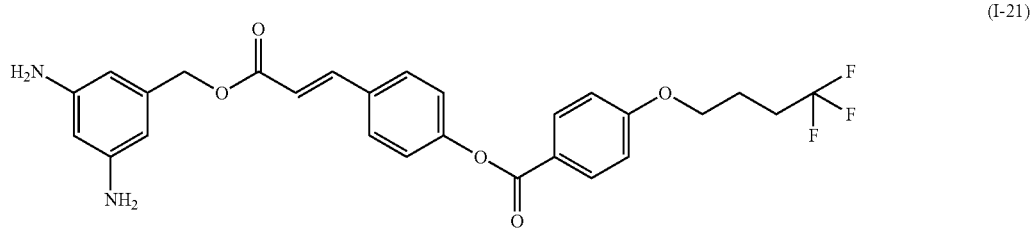

[Chem. 11]

(I-22)
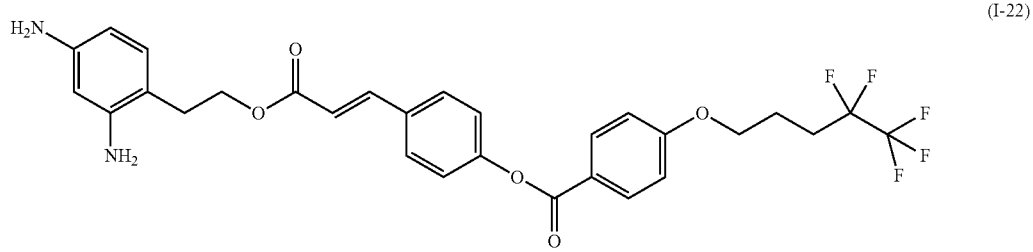

(I-23)
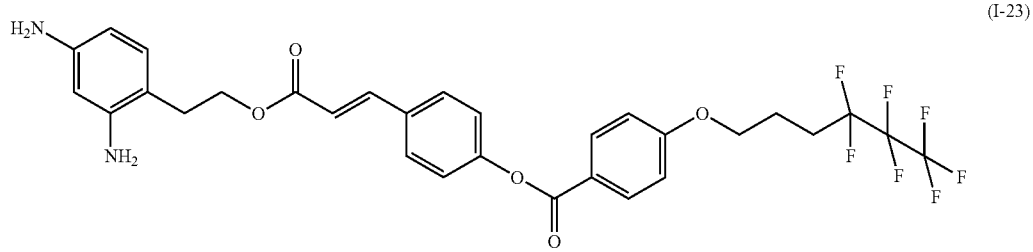

Second Embodiment

Figure 8:
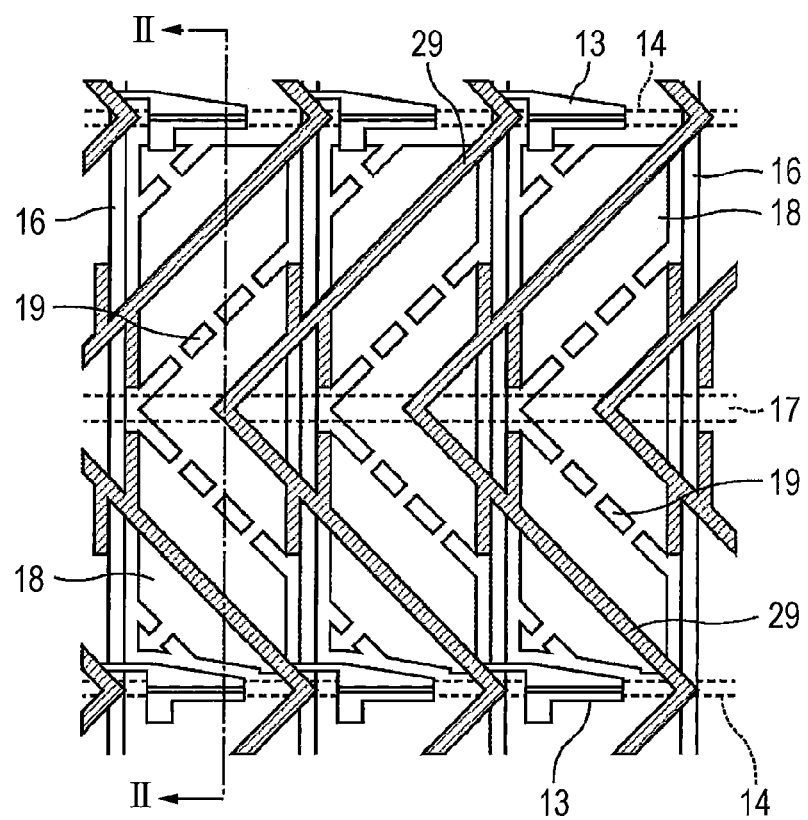
FIG. 8 is a schematic plan view of an MVA mode liquid crystal display according to a second embodiment.
Figure 9:
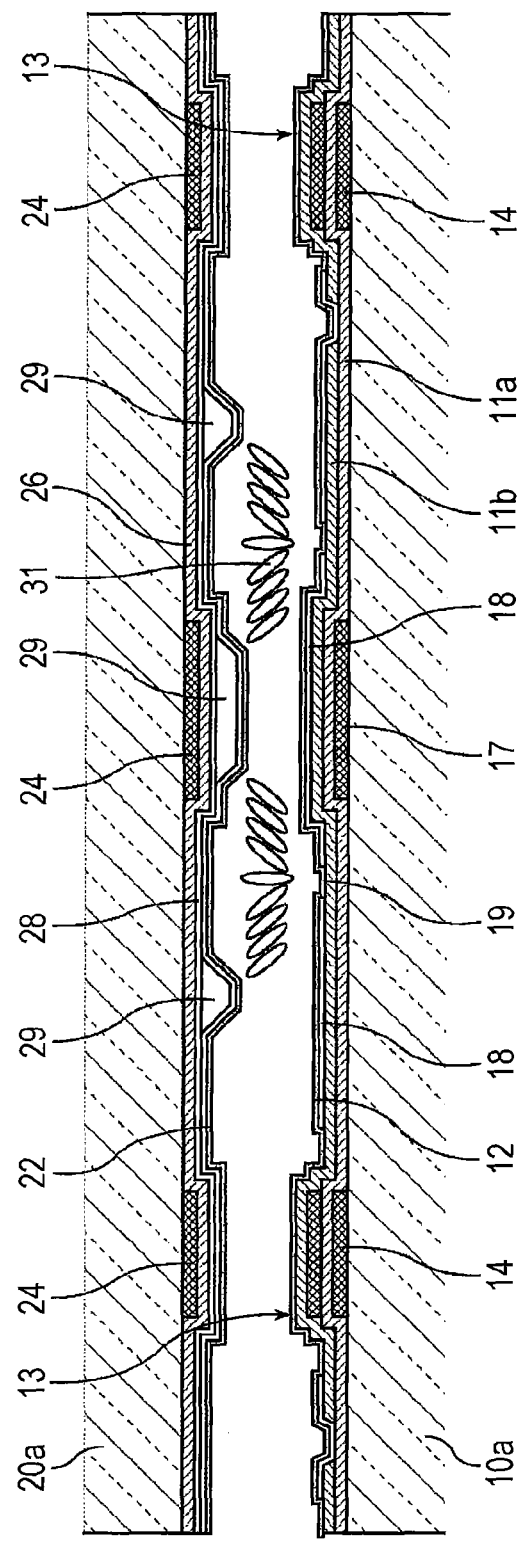
FIG. 9 is a schematic sectional view showing a cross-section taken along line II-II in FIG. 8.

This embodiment relates to a multi-domain vertical alignment (MVA) mode liquid crystal display. FIG. 8 is a schematic plan view of the MVA mode liquid crystal display according to the second embodiment. FIG. 9 is a schematic sectional view showing a cross-section taken along line II-II in FIG. 8.

The liquid crystal display according to this embodiment includes a liquid crystal display panel including an array substrate, a counter substrate bonded thereto with a sealant, and a liquid crystal layer sealed therebetween. The array substrate, the liquid crystal layer, and the counter substrate are arranged in the above order from the backside toward the display side (viewing side), and a backlight is disposed on the backside of the liquid crystal display panel. The liquid crystal display according to this embodiment is a transmissive liquid crystal display that presents a display using light emitted from the backlight, and the light passes through, in order, the array substrate, the liquid crystal layer, and the counter substrate.

The array substrate is a transparent substrate (such as a glass substrate) 10a on which are disposed components such as (A) a plurality of parallel gate signal lines 14, (B) a plurality of source signal lines 16 extending perpendicular to the gate signal lines 14 and parallel to each other, (C) thin-film transistors 13 arranged in a matrix corresponding to the intersections of the gate signal lines 14 and the source signal lines 16, and (D) pixel electrodes 18 disposed in the regions defined by the gate signal lines 14 and the source signal lines 16.

A first insulating film 11a overlies the gate signal lines 14, and the source signal lines 16 overlie the first insulating film 11a. That is, the first insulating film 11a electrically insulates the gate signal lines 14 from the source signal lines 16. Auxiliary capacitor lines 17 are disposed in the same layer as the gate signal lines 14. The auxiliary capacitor lines 17 extend parallel to the gate signal lines 14 midway between the adjacent gate signal lines 14. The source and drain electrodes of the thin-film transistors 13 are disposed in the same layer as the source signal lines 16. A second insulating film 11b overlies the source signal lines 16, and the pixel electrodes 18 overlie the second insulating film 11b. In this embodiment, slits 19 are formed in the pixel electrodes 18 so that a plurality of domains are formed when a voltage is applied to the liquid crystal layer. An alignment film 12 is formed on the surface of the array substrate facing the liquid crystal layer.

The counter substrate is a transparent substrate (such as a glass substrate) 20a on which are disposed components such as (A) a black matrix 24 formed in a grid pattern, (B) color filters 26 formed in the picture elements defined by the grid pattern, and (C) a common electrode 28 formed over the black matrix 24 and the color filters 26. In this embodiment, protrusions 29 are formed using an insulating material on the side of the common electrode 28 facing the liquid crystal layer so as to form a plurality of domains. The protrusions 29 extend parallel to the slits 19 and across the pixels in a zigzag pattern. An alignment film 22 is formed on the surface of the counter substrate facing the liquid crystal layer.

The liquid crystal layer contains liquid crystal molecules 31 having negative dielectric anisotropy. In an off-state, in which the voltage applied to the liquid crystal layer falls below a threshold voltage, the liquid crystal molecules 31 are aligned substantially perpendicular to the surfaces of the alignment films 12 and 22 (substrate plane). In an on-state, in which the voltage applied to the liquid crystal layer exceeds the threshold voltage, the liquid crystal molecules 31, having negative dielectric anisotropy, fall parallel to the substrate plane from the slits 19 and the protrusions 29 depending on the voltage applied. Thus, the liquid crystal layer is birefringent to the light passing therethrough. In this embodiment, the slits 19 and the protrusions 29 form a plurality of domains in which the liquid crystal molecules are aligned in different directions in each pixel.

The alignment films 12 and 22 are formed by depositing and baking a liquid crystal alignment agent containing at least one polymer selected from a polyamic acid and an imide polymer thereof and at least one difunctional monomer that absorbs light with wavelengths of 330 nm or more.

The surfaces of the alignment films 12 and 22 are not subjected to an alignment process. In an off-state, therefore, the pretilt (initial tilt) of the liquid crystal molecules 31 is perpendicular.

A polarizer is disposed on the backside of the array substrate. Another polarizer is disposed on the viewing side of the counter substrate. A retarder may be disposed between the pair of polarizers.

In this embodiment, the backlight 50 may be of any particular type, such as the edge-lit type or the direct-lit type. In addition, the light source may be of any particular type, although if a light source that emits ultraviolet light with wavelengths of 330 nm or more is used, the use of at least one difunctional monomer that absorbs light with wavelengths of 330 nm or more and a polymer thereof provides the effect of reducing a decrease in voltage holding ratio (VHR). The light source may be, for example, a light-emitting diode (LED) or a cold cathode fluorescent lamp (CCFL).

Examples 9 to 16 and Comparative Examples 6 to 10

In Examples 9 to 16, MVA mode liquid crystal display panels according to the second embodiment were actually fabricated using liquid crystal alignment agents according to the present invention, and the voltage holding ratios (VHR) of the liquid crystal display panels were measured. In Comparative Examples 6 to 10, the voltage holding ratios (VHR) of liquid crystal display panels were measured as in Examples 9 to 16 except that liquid crystal alignment agents with different compositions were used.

Liquid crystal alignment agents were first prepared as in Examples 1 to 8 and Comparative Examples 1 to 5 by adding the difunctional monomers represented by formulas (12) to (14) above to a solution in NMP of a polymer for vertical alignment films represented by formula (9) below in the weight ratios shown in Table 3 below.

[Chem. 12]

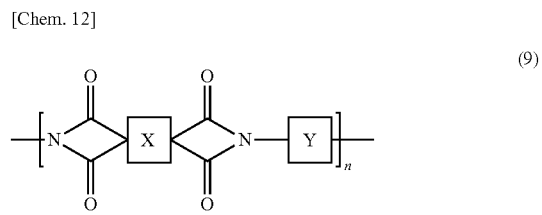

(9)

For the polymer for vertical alignment films in Examples 9 to 16 and Comparative Examples 6 to 10, in formula (9) above, X is a chemical structure of formula (10) below, and Y is a site where a diamine monomer of formula (15) or a diamine monomer of formula (16) below is introduced. The diamine monomer of formula (15) and the diamine monomer (p-phenylenediamine) of formula (16) below are introduced in a molar ratio of 1:3.

[Chem. 13]

(10)

[Chem. 14]

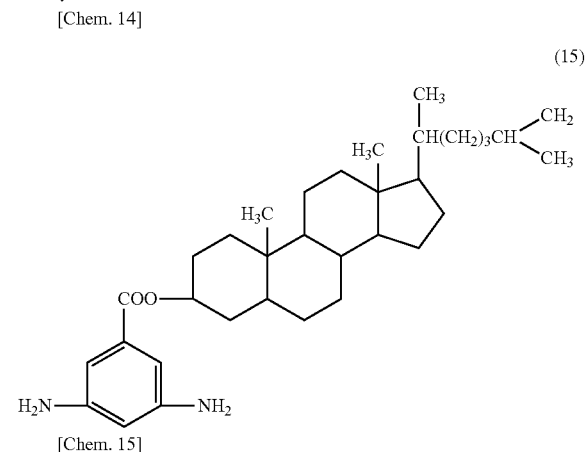

(15)

[Chem. 15]

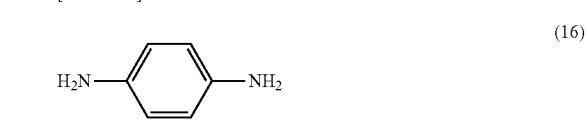

(16)

TABLE 3

| | Type of difunctional monomer | Weight ratio of difunctional monomer to polymer for vertical alignment films |
|---|---|---|
| Example 9 | Formula (12) | 1/40 |
| Example 10 | Formula (12) | 1/20 |
| Example 11 | Formula (12) | 1/10 |
| Example 12 | Formula (12) | 1/5 |
| Example 13 | Formula (13) | 1/40 |
| Example 14 | Formula (13) | 1/20 |
| Example 15 | Formula (13) | 1/10 |
| Example 16 | Formula (13) | 1/5 |
| Comparative Example 6 | Formula (14) | 1/40 |
| Comparative Example 7 | Formula (14) | 1/20 |
| Comparative Example 8 | Formula (14) | 1/10 |
| Comparative Example 9 | Formula (14) | 1/5 |
| Comparative Example 10 | Not contained | 0 |

Next, each of the liquid crystal alignment agents prepared as described above was deposited on a surface of an array substrate. Similarly, each of the liquid crystal alignment agents prepared as described above was deposited on a surface of a counter substrate. The deposited liquid crystal alignment agent was prebaked and postbaked.

Because the orientation of the liquid crystal is controlled in the MVA mode by dividing each pixel into a plurality of domains, the slits 19 are formed in the pixel electrodes 18 on the array substrate, and the protrusions 29 are disposed so as to protrude from the surface of the counter substrate facing the liquid crystal layer. To implement the MVA mode, slits may be formed on both the array substrate and the counter substrate.

Next, after a sealant was applied to the periphery of the array substrate and beads were dispersed over the entire surface of the counter substrate, the array substrate and the counter substrate were bonded together. The two substrates bonded with the sealant had a gap of the distance corresponding to the size of the beads. A liquid crystal composition having negative dielectric anisotropy was then injected into the gap between the substrates. Thus, liquid crystal display panels for measurement were fabricated.

Each of the liquid crystal display panels fabricated as described above was mounted above a direct-lit backlight having LEDs and was continuously irradiated with light from the backlight for 1,000 hours, and the voltage holding ratios (VHR) before and after irradiation were compared. The voltage holding ratios were calculated by placing the liquid crystal display panel in an oven at 70° C. and measuring the electric charge held 16.61 milliseconds (ms) after a voltage of 1 V was applied. The measurements of the voltage holding ratios are shown in Table 4 below.

TABLE 4

| | Initial VHR(%) | VHR after 1,000 hours (%) |
|---|---|---|
| Example 9 | 99.5 | 97.5 |
| Example 10 | 99.5 | 98.5 |
| Example 11 | 99.5 | 99.0 |
| Example 12 | 99.5 | 99.0 |
| Example 13 | 99.5 | 97.5 |
| Example 14 | 99.5 | 98.5 |
| Example 15 | 99.5 | 99.0 |
| Example 16 | 99.5 | 99.0 |
| Comparative Example 6 | 99.5 | 95.5 |
| Comparative Example 7 | 99.5 | 96.5 |
| Comparative Example 8 | 99.5 | 96.5 |
| Comparative Example 9 | 99.5 | 96.5 |
| Comparative Example 10 | 99.5 | 95.0 |

As shown in Table 4, the measurements for the MVA mode liquid crystal displays showed the same tendency as the VATN mode liquid crystal displays. Specifically, Examples 9 to 16, in which a difunctional monomer having anthracene or phenanthrene in the molecule thereof was added, showed smaller decreases in voltage holding ratio and maintained higher voltage holding ratios after continuous irradiation with light from the backlight for 1,000 hours than Comparative Examples 6 to 9, in which a difunctional monomer having biphenyl in the molecule thereof was added, and Comparative Example 10, in which no difunctional monomer was added. The above measurements demonstrate that, in Examples 9 to 16, the difunctional monomer present in the alignment films 12 and 22 or an oligomer or polymer derived therefrom absorbed ultraviolet light contained in the light from the backlight, thus preventing degradation of the liquid crystal due to ultraviolet light.

Among Examples 9 to 16, Examples 10 to 12 and 14 to 16, in which the mixing ratio of the difunctional monomer to the polymer for vertical alignment films was 1/20 or more, showed voltage holding ratios of more than 98% after 1,000 hours.

In Examples 12 and 16, the alignment films 12 and 22 exhibited decreased light transmittance because the liquid crystal alignment agent became opaque after postbaking.

Although the diamine monomers represented by formulas (15) and (16) above were introduced into the polymer for vertical alignment films in Examples 9 to 16 above, one or both of the diamine monomers represented by formulas (15) and (16) above may be replaced by diamine monomers represented by formulas (II-1) to (II-6) below.

[Chem. 16]

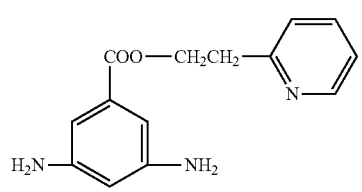
(II-1)

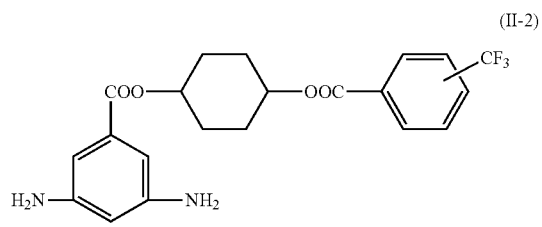
(II-2)

-continued

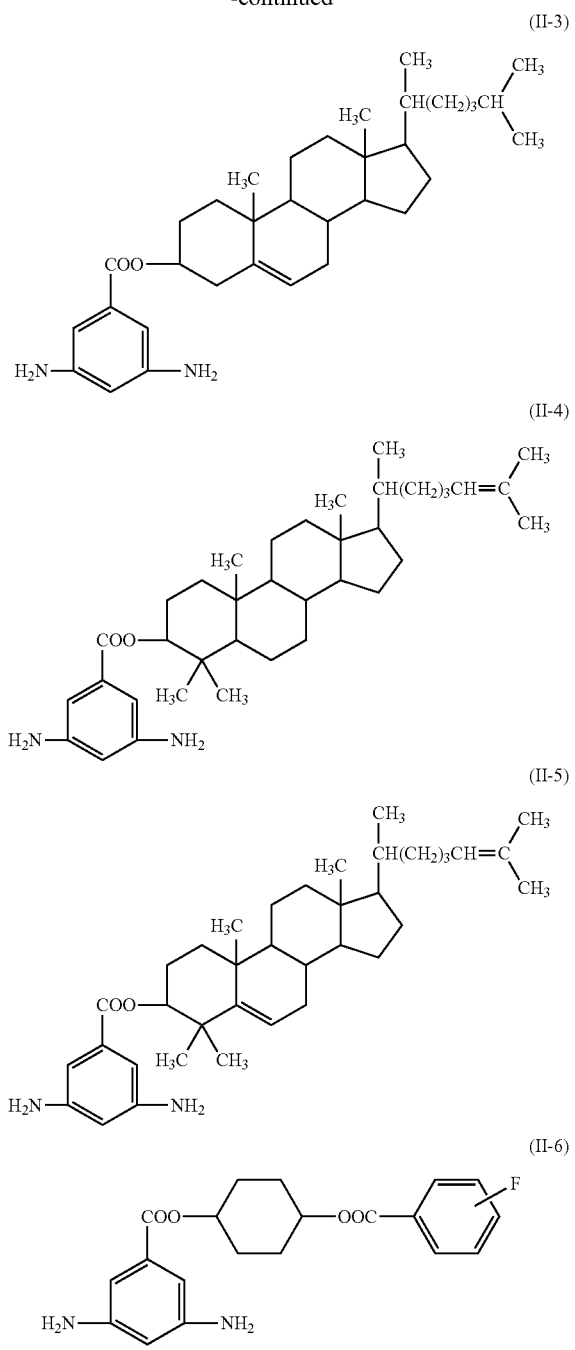

Third Embodiment

Figure 10:
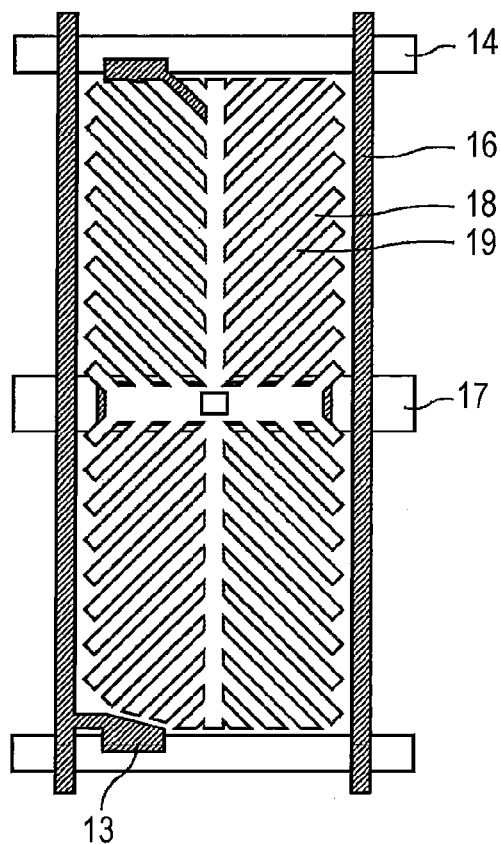
FIG. 10 is a schematic plan view of a PSA-VA mode liquid crystal display according to a third embodiment.

This embodiment relates to a PSA vertical alignment (PSA-VA) mode liquid crystal display. FIG. 10 is a schematic plan view of the PSA-VA mode liquid crystal display according to the third embodiment. FIGS. 11 to 14 are conceptual diagrams illustrating a PSA-layer forming process.

The liquid crystal display according to this embodiment includes a liquid crystal display panel including an array substrate 10, a counter substrate 20 bonded thereto with a sealant, and a liquid crystal layer sealed therebetween that contains liquid crystal molecules 31. The array substrate 10, the liquid crystal layer, and the counter substrate 20 are arranged in the above order from the backside toward the display side (viewing side), and a backlight is disposed on the backside of the liquid crystal display panel. The liquid crystal display according to this embodiment is a transmissive liquid crystal display that presents a display using light emitted from the backlight, and the light passes through, in order, the array substrate 10, the liquid crystal layer, and the counter substrate 20.

The array substrate 10 is a transparent substrate (such as a glass substrate) on which are disposed components such as (A) a plurality of parallel gate signal lines 14, (B) a plurality of source signal lines 16 extending perpendicular to the gate signal lines 14 and parallel to each other, (C) thin-film transistors 13 arranged in a matrix corresponding to the intersections of the gate signal lines 14 and the source signal lines 16, and (D) pixel electrodes 18 disposed in the regions defined by the gate signal lines 14 and the source signal lines 16.

A first insulating film overlies the gate signal lines 14, and the source signal lines 16 overlie the first insulating film. That is, the first insulating film electrically insulates the gate signal lines 14 from the source signal lines 16. Auxiliary capacitor lines 17 are disposed in the same layer as the gate signal lines 14. The auxiliary capacitor lines 17 extend parallel to the gate signal lines 14 midway between the adjacent gate signal lines 14. The source and drain electrodes of the thin-film transistors 13 are disposed in the same layer as the source signal lines 16. A second insulating film overlies the source signal lines 16, and the pixel electrodes 18 overlie the second insulating film. In this embodiment, the pixel electrodes 18 have a fish bone structure including a cross-shaped trunk and many branches extending from the trunk. The branches within the same region defined by the trunk extend parallel to each other, and slits 19 are formed between the branches in the pixel electrodes 18. In the four regions defined by the trunk, the branches extend in directions 90° from each other so that a plurality of domains are formed when a voltage is applied to the liquid crystal layer. An alignment film 12 and a PSA layer 37 are formed on the surface of the array substrate 10 facing the liquid crystal layer.

The counter substrate 20 is a transparent substrate (such as a glass substrate) on which are disposed components such as (A) a black matrix formed in a grid pattern, (B) color filters formed in the picture elements defined by the grid pattern, and (C) a common electrode formed over the black matrix and the color filters. An alignment film 22 and a PSA layer 37 are formed on the surface of the counter substrate 20 facing the liquid crystal layer. In the PSA-VA mode, many slits 19 are formed in the pixel electrodes 18, and no slits 19 are formed in the common electrode.

The liquid crystal layer contains liquid crystal molecules 31 having negative dielectric anisotropy. In an off-state, in which the voltage applied to the liquid crystal layer falls below a threshold voltage, the liquid crystal molecules 31 are aligned substantially perpendicular to the surfaces of the alignment films 12 and 22 (substrate plane) and have a pretilt angle of, for example, from 85° to less than 90°. In an on-state, in which the voltage applied to the liquid crystal layer exceeds the threshold voltage, the liquid crystal molecules 31, having negative dielectric anisotropy, fall parallel to the substrate plane depending on the voltage applied. Thus, the liquid crystal layer is birefringent to the light passing therethrough.

The alignment films 12 and 22 are formed by depositing and baking a liquid crystal alignment agent containing at least one polymer selected from a polyamic acid and an imide polymer thereof and at least one difunctional monomer that absorbs light with wavelengths of 330 nm or more.

The PSA layers 37 are formed on the surfaces of the alignment films 12 and 22. The PSA layers 37 function to determine the orientation (initial orientation) of the liquid crystal molecules 31 when no voltage is applied thereto, thus allowing, for example, stabilized alignment of the liquid crystal layer and improved response speed.

One known method for forming a PSA layer is to photopolymerize a PSA monomer 35 contained in the liquid crystal layer. During photopolymerization, a voltage may or may not be applied to the liquid crystal layer. An example of a method for forming a PSA layer while applying a voltage to the liquid crystal layer will now be described with reference to FIGS. 11 to 14.

Figure 11:
FIG. 11 is a conceptual diagram illustrating a first step of a PSA-layer forming process.
Figure 11:
Figure 12:
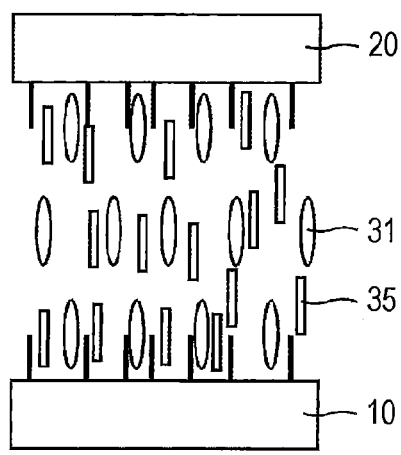
FIG. 12 is a conceptual diagram illustrating a second step of the PSA-layer forming process.
Figure 13:
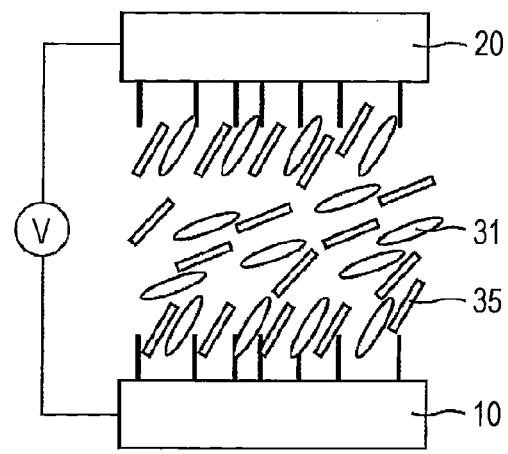
FIG. 13 is a conceptual diagram illustrating a third step of the PSA-layer forming process.
Figure 14:
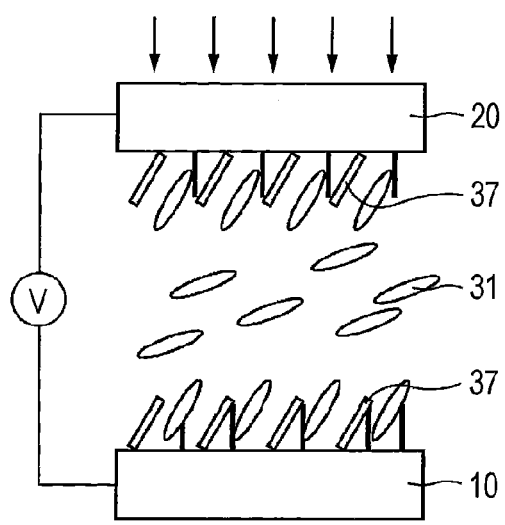
FIG. 14 is a conceptual diagram illustrating a fourth step of the PSA-layer forming process.

Referring first to FIG. 11, as a first step of the PSA-layer forming process, the array substrate 10 and the counter substrate 20 are bonded together, with the alignment films 12 and 22 facing each other, so as to be spaced by spacers at the distance corresponding to the thickness of the liquid crystal layer. Turning to FIG. 12, as a second step of the PSA-layer forming process, a liquid crystal composition containing the PSA monomer 35 and the liquid crystal molecules 31 is sealed between the substrates 10 and 20. Turning to FIG. 13, as a third step of the PSA-layer forming process, a voltage is applied to the liquid crystal layer. Turning to FIG. 14, as a fourth step of the PSA-layer forming process, the liquid crystal layer is irradiated with ultraviolet light while applying a voltage thereto. As a result, the PSA monomer 35 is photopolymerized, thus forming the PSA layer 37.

The constituents of the PSA layers 37 can be determined by chemical analysis using, for example, $^{13}$C-nuclear magnetic resonance (NMR) or mass spectrometry (MS).

In this embodiment, a polarizer is disposed on the backside of the array substrate 10. Another polarizer is disposed on the viewing side of the counter substrate 20. A retarder may be disposed between the pair of polarizers.

The backlight may be of any particular type, such as the edge-lit type or the direct-lit type. In addition, the light source may be of any particular type, although if a light source that emits ultraviolet light with wavelengths of 330 nm or more is used, the use of at least one difunctional monomer that absorbs light with wavelengths of 330 nm or more and a polymer thereof provides the effect of reducing a decrease in voltage holding ratio (VHR). The light source may be, for example, a light-emitting diode (LED) or a cold cathode fluorescent lamp (CCFL).

Examples 17 to 24 and Comparative Examples 11 to 15

In Examples 17 to 24, PSA-VA mode liquid crystal display panels according to the third embodiment were actually fabricated using liquid crystal alignment agents according to the present invention, and the voltage holding ratios (VHR) of the liquid crystal display panels were measured. In Comparative Examples 11 to 15, the voltage holding ratios (VHR) of liquid crystal display panels were measured as in Examples 17 to 24 except that liquid crystal alignment agents with different compositions were used.

Liquid crystal alignment agents were first prepared by adding the difunctional monomers represented by formulas (12) to (14) above to a solution in NMP of the same polymer for vertical alignment films as in Examples 9 to 16 and Comparative Examples 6 to 10 in the weight ratios shown in Table 5 below.

TABLE 5

| | Type of difunctional monomer | Weight ratio of difunctional monomer to polymer for vertical alignment films |
|---|---|---|
| Example 17 | Formula (12) | 1/40 |
| Example 18 | Formula (12) | 1/20 |
| Example 19 | Formula (12) | 1/10 |
| Example 20 | Formula (12) | 1/5 |
| Example 21 | Formula (13) | 1/40 |
| Example 22 | Formula (13) | 1/20 |
| Example 23 | Formula (13) | 1/10 |
| Example 24 | Formula (13) | 1/5 |
| Comparative Example 11 | Formula (14) | 1/40 |
| Comparative Example 12 | Formula (14) | 1/20 |
| Comparative Example 13 | Formula (14) | 1/10 |
| Comparative Example 14 | Formula (14) | 1/5 |
| Comparative Example 15 | Not contained | 0 |

Next, each of the liquid crystal alignment agents prepared as described above was deposited on a surface of an array substrate 10. Similarly, each of the liquid crystal alignment agents prepared as described above was deposited on a surface of a counter substrate 20. The deposited liquid crystal alignment agent was prebaked and postbaked.

Next, after a sealant was applied to the periphery of the array substrate 10 and beads were dispersed over the entire surface of the counter substrate 20, the array substrate 10 and the counter substrate 20 were bonded together. The two substrates 10 and 20 bonded with the sealant had a gap of the distance corresponding to the size of the beads. A liquid crystal composition having negative dielectric anisotropy was then injected into the gap between the substrates 10 and 20. The liquid crystal composition contained 0.3% by weight of the biphenyl difunctional monomer represented by formula (14) above. After the injection of the liquid crystal composition, the liquid crystal layer was irradiated with ultraviolet light from a black light while applying a voltage thereto to photopolymerize the biphenyl difunctional monomer, thus forming PSA layers 37 on the surfaces of the alignment films 12 and 22. Thus, liquid crystal display panels for measurement were fabricated.

Each of the liquid crystal display panels fabricated as described above was mounted above a direct-lit backlight having LEDs and was continuously irradiated with light from the backlight for 1,000 hours, and the voltage holding ratios (VHR) before and after irradiation were compared. The voltage holding ratios were calculated by placing the liquid crystal display panel in an oven at 70° C. and measuring the electric charge held 16.61 milliseconds (ms) after a voltage of 1 V was applied. The measurements of the voltage holding ratios are shown in Table 6 below.

TABLE 6

| | Initial VHR(%) | VHR after 1,000 hours (%) |
|---|---|---|
| Example 17 | 99.5 | 97.5 |
| Example 18 | 99.5 | 98.0 |
| Example 19 | 99.5 | 98.0 |
| Example 20 | 99.5 | 99.0 |
| Example 21 | 99.5 | 97.5 |
| Example 22 | 99.5 | 98.0 |
| Example 23 | 99.5 | 98.0 |
| Example 24 | 99.5 | 99.0 |
| Comparative Example 11 | 99.5 | 94.5 |
| Comparative Example 12 | 99.5 | 94.5 |
| Comparative Example 13 | 99.5 | 94.4 |

TABLE 6-continued

|  | Initial VHR(%) | VHR after 1,000 hours (%) |
|---|---|---|
| Comparative Example 14 | 99.5 | 94.5 |
| Comparative Example 15 | 99.5 | 91.5 |

As shown in Table 6, the measurements for the PSA-VA mode liquid crystal displays showed the same tendency as the VATN mode liquid crystal displays and the MVA mode liquid crystal displays. Specifically, Examples 17 to 24, in which a difunctional monomer having anthracene or phenanthrene in the molecule thereof was added, showed smaller decreases in voltage holding ratio and maintained higher voltage holding ratios after continuous irradiation with light from the backlight for 1,000 hours than Comparative Examples 11 to 14, in which a difunctional monomer having biphenyl in the molecule thereof was added, and Comparative Example 15, in which no difunctional monomer was added. The above measurements demonstrate that, in Examples 17 to 24, the difunctional monomer present in the alignment films 12 and 22 or an oligomer or polymer derived therefrom absorbed ultraviolet light contained in the light from the backlight, thus preventing degradation of the liquid crystal due to ultraviolet light.

Among Examples 17 to 24, Examples 18 to 20 and 22 to 24, in which the mixing ratio of the difunctional monomer to the polymer for vertical alignment films was 1/20 or more, showed voltage holding ratios of more than 98% after 1,000 hours.

In Examples 20 and 24, the alignment films 12 and 22 exhibited decreased light transmittance because the liquid crystal alignment agent became opaque after postbaking.

Although the diamine monomers represented by formulas (15) and (16) above were introduced into the polymer for vertical alignment films in Examples 17 to 24 above, one or both of the diamine monomers represented by formulas (15) and (16) above may be replaced by the diamine monomers represented by formulas (II-1) to (II-6) above.

Comparative Example 16

In Comparative Example 16, a VATN mode liquid crystal display panel according to the first embodiment was actually fabricated as in Example 3 except that a liquid crystal alignment agent having a different composition was used, and the voltage holding ratio (VHR) of the liquid crystal display panel was measured. The liquid crystal alignment agent used in Comparative Example 16 contained an additive represented by formula (17) below instead of the difunctional monomer represented by formula (12) above, which was used in Example 3, in a weight ratio of 1/10 to the polymer for vertical alignment films.

[Chem. 17]

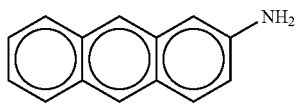

(17)

In Comparative Example 16, the initial VHR before irradiation of the liquid crystal display panel with light from the backlight was 95.2%, and the VHR after continuous irradiation with light from the backlight for 1,000 hours was in the range of 60% to 70%. This demonstrates that the same effect as in Example 3 is not achieved simply by adding an additive having an anthracene backbone in the molecule thereof. It is believed that an unpolymerized additive partially dissolves into the liquid crystal layer, thus significantly decreasing the VHR. That is, it is believed that polymerization of an additive prevents it from dissolving into the liquid crystal layer, thus allowing improved VHR and structural stabilization of the alignment film.

This application claims priority to Japanese Patent Application No. 2010-286046 filed on Dec. 22, 2010, under the Paris Convention or the legislation of the countries for entry. The entire content of the application is incorporated herein by reference.

REFERENCE SIGNS LIST

10: array substrate
10a: transparent substrate
11a: first insulating film
11b: second insulating film
12: alignment film
13: thin-film transistor
14: gate signal line
16: source signal line
17: auxiliary capacitor line
18: pixel electrode
19: slit in pixel electrode
20: counter substrate
20a: transparent substrate
22: alignment film
24: black matrix
26: color filter
28: common electrode
29: protrusion
30: liquid crystal layer
31: liquid crystal molecule
35: PSA monomer
37: PSA layer
40: sealant
50: backlight

The invention claimed is:

1. A liquid crystal display comprising an active substrate, a counter substrate, and a liquid crystal layer having negative dielectric anisotropy disposed between the active substrate and the counter substrate,
at least one of the active substrate and the counter substrate having an alignment film formed using a liquid crystal alignment agent containing a mixture of at least one polymer selected from a polyamic acid and an imide polymer thereof, and at least one difunctional monomer, wherein the at least one polymer has a photoreactive functional group which is one of chalcone, cinnamate, azo and coumarin, and aligns the liquid crystal perpendicularly, the imide polymer being represented by formula (9) in which Y is a site where a diamine having the photoreactive group is introduced, and X is a chemical structure represented by formula (10):

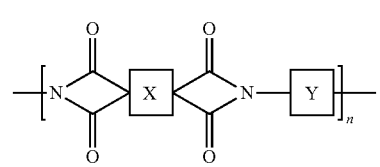

(9)

-continued

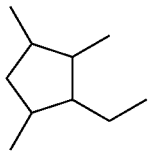
(10)

the at least one difunctional monomer comprising a difunctional monomer represented by general formula (I):

wherein $P^1$ and $P^2$ are the same or different and are acrylate, methacrylate, vinyl, vinyloxy, or epoxy; $A^1$ and $A^2$ are each a polycyclic aromatic hydrocarbon represented by formula (6):

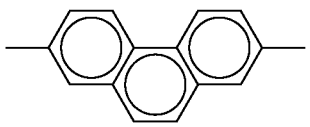
(6)

where the hydrogen atoms contained in $A^1$ and $A^2$ are optionally substituted with halogen, methyl, ethyl, or propyl; $Z^1$ is COO, OCO, O, CO, NHCO, CONH, or S, or is a direct bond between $A^1$ and $A^2$ or between $A^2$ and $A^2$; and n is 0, 1, or 2.

2. The liquid crystal display according to claim 1, wherein in general formula (I), n=0, $P^1$ and $P^2$ are the same or different and are acrylate or methacrylate, and $A^1$ is the polycyclic aromatic hydrocarbon represented by formula (6).

3. The liquid crystal display according to claim 1, further comprising a polymer layer formed between the liquid crystal layer and the alignment film by photopolymerization of a monomer contained in the liquid crystal layer.

4. A method for manufacturing a liquid crystal display, comprising the steps of forming an active substrate, forming a counter substrate, and forming a liquid crystal layer having negative dielectric anisotropy between the active substrate and the counter substrate,
at least one of the steps of forming the active substrate and forming the counter substrate including the steps of providing a pixel electrode or a counter electrode and forming an alignment film on the active substrate or the counter substrate using a liquid crystal alignment agent containing a mixture of at least one polymer selected from a polyamic acid and an imide polymer thereof, and at least one difunctional monomer,
wherein the at least one polymer has a photoreactive functional group which is one of chalcone, cinnamate, azo and coumarin, and aligns the liquid crystal perpendicularly, the imide polymer being represented by formula (9) in which Y is a site where a diamine having the photoreactive group is introduced, and X is a chemical structure represented by formula (10):

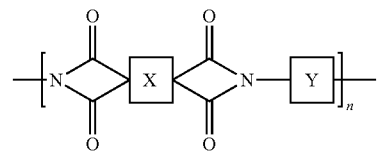
(9)

(10)

the at least one difunctional monomer comprising a difunctional monomer represented by general formula (I):

$P^1\text{-}A^1\text{-}(Z^1\text{-}A^2)_n\text{-}P^2$ (I)

wherein $P^1$ and $P^2$ are the same or different and are acrylate, methacrylate, vinyl, vinyloxy, or epoxy; $A^1$ and $A^2$ are each a polycyclic aromatic hydrocarbon represented by formula (6):

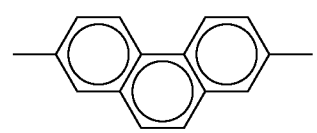
(6)

where the hydrogen atoms contained in $A^1$ and $A^2$ are optionally substituted with halogen, methyl, ethyl, or propyl; $Z^1$ is COO, OCO, O, CO, NHCO, CONH, or S, or is a direct bond between $A^1$ and $A^2$ or between $A^2$ and $A^2$; and n is 0, 1, or 2.

5. The method for manufacturing a liquid crystal display according to claim 4, wherein in general formula (I), n=0, $P^1$ and $P^2$ are the same or different and are acrylate or methacrylate, and $A^1$ is the polycyclic aromatic hydrocarbon represented by formula (6).

6. The method for manufacturing a liquid crystal display according to claim 4, further comprising a step of forming a polymer layer between the liquid crystal layer and the alignment film by photopolymerization of a monomer contained in the liquid crystal layer.

* * * * *